(12) United States Patent
Choi et al.

(10) Patent No.: US 11,474,713 B2
(45) Date of Patent: Oct. 18, 2022

(54) STORAGE DEVICE AND OPERATING METHOD THEREOF

(71) Applicant: SK hynix Inc., Gyeonggi-do (KR)

(72) Inventors: Han Choi, Gyeonggi-do (KR); Dae Hee Kim, Gyeonggi-do (KR); Yong Gap Bae, Gyeonggi-do (KR); Gak Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/217,332

(22) Filed: Mar. 30, 2021

(65) Prior Publication Data
US 2022/0107737 A1 Apr. 7, 2022

(30) Foreign Application Priority Data
Oct. 6, 2020 (KR) .................. 10-2020-0128785

(51) Int. Cl.
*G06F 3/06* (2006.01)
(52) U.S. Cl.
CPC .......... *G06F 3/0622* (2013.01); *G06F 3/0653* (2013.01); *G06F 3/0679* (2013.01)
(58) Field of Classification Search
None
See application file for complete search history.

(56) References Cited

U.S. PATENT DOCUMENTS

| 10,686,607 | B2* | 6/2020 | Chen | G06F 21/6218 |
|---|---|---|---|---|
| 10,698,613 | B1* | 6/2020 | Wigmore | G06F 13/4022 |
| 10,789,062 | B1* | 9/2020 | Suryanarayana | G06F 8/65 |
| 2018/0150293 | A1* | 5/2018 | Nachimuthu | G06F 13/4027 |
| 2018/0350296 | A1* | 12/2018 | Thompson | G06F 3/0656 |
| 2019/0286823 | A1* | 9/2019 | Walrant | H04L 9/3236 |
| 2020/0333964 | A1* | 10/2020 | Wigmore | H04L 9/0894 |
| 2022/0091750 | A1* | 3/2022 | Kang | G06F 3/0607 |
| 2022/0100412 | A1* | 3/2022 | Martin | G06F 3/0679 |

FOREIGN PATENT DOCUMENTS

| KR | 10-2014-0054204 | 5/2014 |
|---|---|---|
| KR | 10-2015-0106219 | 9/2015 |
| KR | 10-2017-0078407 | 7/2017 |

* cited by examiner

*Primary Examiner* — Kevin Verbrugge
(74) *Attorney, Agent, or Firm* — IP & T Group LLP

(57) ABSTRACT

There are provided a storage device and an operating method thereof. The storage device includes: a nonvolatile memory device including a system block for storing firmware data including a program code of firmware, a signature in which the program code is encoded, and an authentication key; a volatile memory device configured to store operational firmware data; and a memory controller configured to, when power is applied to the storage device, store the firmware data as the operational firmware data in the volatile memory device, perform a firmware validity test for detecting whether the operational firmware data and the firmware data matches each other, in response to a test event, and perform a reset operation based on a result of the firmware validity test.

20 Claims, 15 Drawing Sheets

STORAGE DEVICE AND OPERATING METHOD THEREOF

CROSS-REFERENCE TO RELATED APPLICATION

The present application claims priority under 35 U.S.C. § 119(a) to Korean patent application number 10-2020-0128785, filed on Oct. 6, 2020, which is incorporated herein by reference in its entirety.

BACKGROUND

Field of Invention

The present disclosure generally relates to an electronic device, and more particularly, to a storage device and an operating method thereof.

Description of Related Art

A storage device is a device which stores data under the control of a host. The storage device may include a memory device which stores data and a memory controller which controls the memory device. The memory device is classified into a volatile memory device and a nonvolatile memory device.

The volatile memory device may store data while being supplied with power from a power supply. When the supply of power is interrupted, data stored in the volatile memory device may disappear. The volatile memory device may include a Static Random Access Memory (SRAM), a Dynamic Random Access Memory (DRAM), and the like.

The nonvolatile memory device may be a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device capable of maintaining high security by detecting firmware corrupted by a malicious attack or a memory bit flip and resetting the corrupted firmware as valid firmware, and an operating method of the storage device.

In accordance with an aspect of the present disclosure, there is provided a storage device including: a nonvolatile memory device including a system block for storing firmware data including a program code of firmware, a signature in which the program code is encoded, and an authentication key; a volatile memory device configured to store operational firmware data; and a memory controller configured to, when power is applied to the storage device, store the firmware data as the operational firmware data in the volatile memory device, perform a firmware validity test for detecting whether the operational firmware data and the firmware data matches each other, in response to a test event, and perform a reset operation based on a result of the firmware validity test.

In accordance with another aspect of the present disclosure, there is provided a storage device including: a nonvolatile memory device including a system block for storing firmware data including a program code of firmware, a signature in which the program code is encoded, and an authentication key; a first volatile memory device configured to store operational firmware data; a second volatile memory device configured to store the firmware data; a first firmware controller configured to, when power is applied to the storage device, store the firmware data as the operational firmware data in the first volatile memory device, and execute operational firmware; and a second firmware controller configured to perform a firmware validity test for detecting whether the operation firmware data acquired from the first volatile memory device and the firmware data stored in the second volatile memory device matches each other in response to a test event being detected and perform a reset operation on the operational firmware data stored in the first volatile memory device based on a result obtained by performing the firmware validity test.

In accordance with still another aspect of the present disclosure, there is provided a storage device including: a nonvolatile memory device including a system block for storing firmware data including a program code of firmware, a signature in which the program code is encoded, and an authentication key; a first volatile memory device configured to store operational firmware data; a second volatile memory device configured to store the firmware data; a first firmware controller configured to, when power is applied to the storage device, store the firmware data as the operational firmware data in the first volatile memory device, and execute operational firmware; and a second firmware controller configured to provide the first firmware controller with a request signal for requesting the first firmware controller to transmit the operational firmware data in response to a test event being detected, perform a firmware validity test for detecting whether the operational firmware data provided from the first firmware controller and the firmware data stored in the second volatile memory device matches each other and perform a reset operation on the operational firmware data stored in the first volatile memory device based on a result obtained by performing the firmware validity test.

In accordance with still another aspect of the present disclosure, there is provided a method for operating a storage device, the method including: storing, as operational firmware data, firmware data stored in a system block included in a nonvolatile memory device; detecting a test event; performing a firmware validity test for detecting whether the operational firmware data and the firmware data do not accord with each other in response to the test event being detected; and performing a reset operation based on a result obtained by performing the firmware validity test.

In accordance with still another aspect of the present disclosure, there is provided a method for operating a storage device, the method including: loading firmware onto each of first and second memory regions; running the firmware loaded onto the first memory region; determining the running firmware as corrupted with reference to the firmware loaded onto the second memory region; and replacing the corrupted firmware with the firmware loaded onto the second memory region.

BRIEF DESCRIPTION OF THE DRAWINGS

Various embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
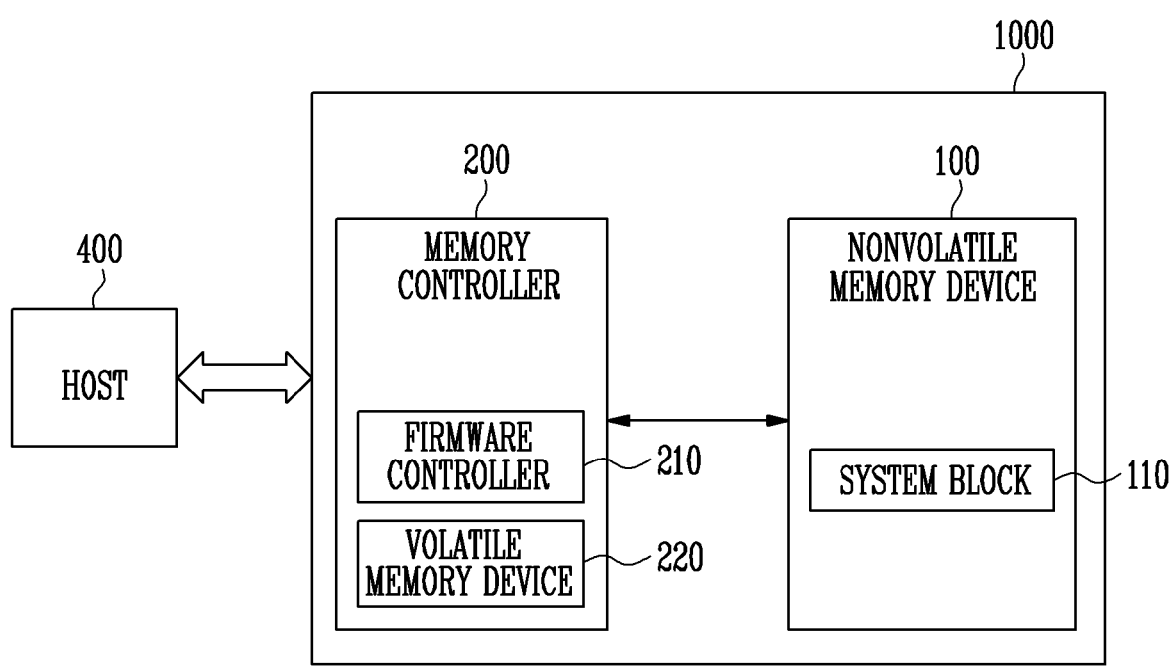
FIG. 1 is a diagram illustrating a storage system in accordance with an embodiment of the present disclosure.

FIG. 1 is a diagram illustrating a storage system in accordance with an embodiment of the present disclosure.

Referring to FIG. 1, the storage system may be implemented as a data processing system including a personal computer (PC), a data center, an enterprise type data storage system, and a direct attached storage (DAS), a data processing system including a storage area network (SAN), a data processing system including a network attached storage, or the like.

The storage system may include a storage device 1000 and a host 400.

The storage device 1000 may be a device for storing data according to a request of the host 400, such as a mobile phone, a smart phone, an MP3 player, a laptop computer, a desktop computer, a game console, a TV, a tablet PC or an in-vehicle infotainment system.

The request of the host 400 may mean, for example, a write request, a read request, an erase request, a storage device lock request, or the like.

The storage device 1000 may be a device including an embedded system. The embedded system may be a system in which software for performing only a predetermined specific function is embedded in a microprocessor installed in various types of electronic products or information devices instead of general computers.

The storage device 1000 may be manufactured as one of various types of storage devices according to a host interface that is a communication scheme with the host 400. For example, the storage device 1000 may be implemented with any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be manufactured as one of various kinds of package types. For example, the storage device 1000 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The storage device 1000 may include a nonvolatile memory device 100 and a memory controller 200.

The nonvolatile memory device 100 may be a memory device in which data does not disappear even when the supply of power is interrupted.

The nonvolatile memory device 100 may operate under the control of the memory controller 200. Specifically, the nonvolatile memory device 100 may receive a command and an address from the memory controller 200, and access a memory cell selected by the address among memory cells (not shown). The nonvolatile memory device 100 may perform an operation indicated by the command on the memory cell selected by the address.

The command may be, for example, a program command, a read command, or an erase command, and the operation indicated by the command may be, for example, a program operation (or write operation), a read operation, or an erase operation.

For example, the nonvolatile memory device 100 may receive a program command, an address, and data, and program the data in a memory cell selected by the address. The data to be programmed in the selected memory cell may be defined as write data.

For example, the nonvolatile memory device 100 may receive a read command and an address, and read data from an area selected by the address in a memory cell array (not shown). The data to be read from the selected area among data stored in the nonvolatile memory device 100 may be defined as read data.

For example, the nonvolatile memory device 100 may receive an erase command and an address, and erase data stored in an area selected by the address.

The nonvolatile memory device 100 may include a Read Only Memory (ROM), a Programmable ROM (PROM), an Electrically Programmable ROM (EPROM), an Electrically Erasable and Programmable ROM (EEPROM), a flash memory, and the like.

The flash memory may include a NAND flash memory, a vertical NAND flash memory, a NOR flash memory, and the like.

In this specification, for convenience of description, the nonvolatile memory device 100 is a NAND flash memory.

The nonvolatile memory device 100 may store write data under the control of the memory controller 200, or read stored read data and provide the read data to the memory controller 200.

The nonvolatile memory device 100 may include at least one plane. One plane may include a memory cell array including memory cells for storing write data.

The memory cell array may include a plurality of memory blocks.

The memory block may be a unit for performing an erase operation of erasing data.

The memory block may include a plurality of pages (not shown). The page may be a unit for performing a program operation for storing write data or a read operation for reading stored read data.

In an embodiment, some of the plurality of memory blocks may correspond to a system block 110. The system block 110 may store firmware data.

The firmware data may be data including information on firmware. The firmware data will be described later with reference to FIG. 2.

The firmware may be stored in the nonvolatile memory device 100 and may be a micro program for controlling hardware. The firmware is identical to software from the viewpoint of a program but has a close relationship with hardware. Hence, the firmware is distinguished from general application software, and has characteristics of both the software and the hardware.

When the storage device 1000 is supplied with power to be booted, the firmware data stored in the nonvolatile memory device 100 may be loaded to the memory controller 200 (e.g., a volatile memory device 220 included in the memory controller 200).

The memory controller 200 may control overall operations of the storage device 1000.

When power is applied to the storage device 1000, the memory controller 200 may execute firmware. When the nonvolatile memory device 100 is a flash memory device, the firmware may include a host interface layer, a flash translation layer, and a flash interface layer.

The host interface layer may control an operation between the host 400 and the memory controller 200.

The flash translation layer may translate a logical address provided from the host 400 into a physical address. To this end, the memory controller 200 may store map data as a mapping relationship between the logical address and the physical address.

The flash interface layer may control communication between the nonvolatile memory device 100 and the memory controller 200.

The memory controller 200 may control the nonvolatile memory device 100 to perform a program operation, a read operation, and an erase operation respectively in response to a write request, a read request, and an erase request of the host 400.

In the program operation, the memory controller 200 may provide the nonvolatile memory device 100 with a program command, a physical address, and write data.

In the read operation, the memory controller 200 may provide the nonvolatile memory device 100 with a read command and a physical address.

In the erase operation, the memory controller 200 may provide the nonvolatile memory device 100 with an erase command and a physical address.

The memory controller 200 may autonomously generate a command, an address, and data regardless of any request provided from the host 400. The memory controller 200 may transmit the command, the address, and the data, which are autonomously generated, to the nonvolatile memory device 100.

For example, the memory controller 200 may generate a command for performing a background operation, an address, and data. Also, the memory controller 200 may provide the nonvolatile memory device 100 with the command, the address, and the data.

The background operation may be at least one of wear leveling, read reclaim, and garbage collection.

The wear leveling may mean an operation of storing a number of times that memory blocks are erased, and programing data in a memory block which is erased a smallest number of times.

The read reclaim may mean an operation of moving data stored in a memory block to another memory block before an uncorrectable error occurs in the data stored in the memory block.

The garbage collection may mean an operation of copying valid data included in a bad block among memory blocks to a free block, and erasing invalid data included in the bad block.

The memory controller 200 may control two or more nonvolatile memory devices 100. The memory controller 200 may control the nonvolatile memory devices 100 according to an interleaving technique to improve operational performance.

The interleaving technique may be a technique for controlling operations on the two or more nonvolatile memory devices 100 to overlap with each other.

The firmware executed by the memory controller 200 may be corrupted by a malicious attack or a memory bit flip. When the firmware is corrupted, write data provided from the host 400 may be changed by the corrupted firmware. An error may occur in the write data, and the write data including the error may be stored in the nonvolatile memory device 100.

In an embodiment, the memory controller 200 may detect a test event, perform a firmware validity test for testing the validity of operational firmware when the test event is detected, and perform a reset operation based on a result obtained by performing the firmware validity test.

In an embodiment, the test event may be triggered for every predetermined test period. For example, the memory controller 200 may measure a time for which the memory controller 200 is turned on, and detect the test event according to whether the time corresponds to a test period.

In an embodiment, the test event may be triggered when a state of the memory controller 200 is an idle state. That is, the memory controller 200 may detect the test event according to whether the state of the memory controller 200 is the idle state.

The idle state may be a state in which the memory controller 200 stands by. The memory controller 200 may stand by until the memory controller 200 receives a request from the host 400. Specifically, the idle state may occur in a period corresponding to that from after a response to the request provided from the host 400 is provided to the host 400 to when a subsequent request to be provided from the host 400 is provided to the memory controller 200.

In an embodiment, the test event may be triggered by an erase request or a storage device lock request, which is output from the host 400. The storage device lock request may be for requesting the storage device 1000 not to perform a program operation, a read operation, and an erase operation, which respectively correspond to a write request, a read request, and an erase request.

The test event is not limited to the above-described example.

The operational firmware may be firmware executed by the memory controller 200. In general, operational firmware data is supposed to be identical to the firmware data stored in the system block 110.

The firmware validity test may mean an operation of testing the validity of the operational firmware. Specifically, the firmware validity test may be an operation of testing the integrity of the operational firmware data based on the firmware data through an error detection algorithm.

The error detection algorithm may mean, for example, a cyclic redundancy check (CRC), a checksum, a hash-based message authentication code (HMAC), an advanced encryption standard (AES), a Rivest Shamir Adleman-probabilistic signature scheme (RSA-PSS), and the like.

The CRC may be an algorithm for verifying integrity of data by using a check value for checking whether an error exists in the data. The checksum may be an algorithm for verifying integrity of data by using a checksum value for checking whether an error exists in the data.

When a client generates a hash value through a hash function by using an authentication key for authentication and a message having an arbitrary length, and provides a sever with the hash value and the message, the sever generates a hash value from the message provided from the client by using an authentication key belonging thereto. The HMAC may be an algorithm for verifying integrity of data according to whether the hash value provided from the client and the hash value generated by the server accord with each other.

The AES may be an algorithm for encoding data by using a symmetric key (or an asymmetric key), decoding the encoded data by using an asymmetric key (or a symmetric key) and verifying integrity of the data by using the decoded data. RSA-PSS may be an algorithm for decoding a signature encoded through an RSA encryption algorithm by using an authentication key and verifying integrity of data by comparing a message and the decoded signature.

In this specification, for convenience of description, the memory controller 200 performs the firmware validity test by using an RSA-PSS technique.

When the operational firmware is not valid may mean that the operational firmware is corrupted and therefore the operational firmware data is not identical to original firmware data (e.g., the firmware data stored in the system block 110). When the operational firmware is valid may mean that the operational firmware is not corrupted and therefore the operational firmware data is identical to the original firmware data. The firmware validity test will be described later.

The reset operation may mean an operation of resetting invalid operational firmware (i.e., the corrupted operational firmware) as firmware corresponding to the firmware data stored in the system block 110.

In an embodiment, the memory controller 200 may measure a test operation time. The test operation time may be an amount of time taken for the memory controller 200 to perform the firmware validity test. The memory controller 200 may reserve the firmware validity test according to whether the test operation time has reached a predetermined maximum time amount. The memory controller 200 may store a test command (not shown) according to a predetermined scheduling order, in response to the firmware validity test being reserved. The test command may be a command indicating that the firmware validity test will be started. The test command may be stored in, for example, a predetermined command queue (not shown). This will be described later with reference to FIG. 8.

In an embodiment, the memory controller 200 may detect a test event according to whether the test command is to be output according to the scheduling order. For example, when the test command stored in the command queue is output, the test event may be detected.

In an embodiment, before the memory controller 200 performs the reset operation, the memory controller 200 may suspend an operation corresponding to a request provided from the host 400. For example, before the memory controller 200 performs the reset operation, the memory controller may suspend a program operation corresponding to a write request provided from the host 400, and perform the reset operation after the program operation is suspended. However, the present disclosure is not limited thereto.

In an embodiment, the memory controller 200 may include a firmware controller 210 and the volatile memory device 220.

The firmware controller 210 may execute operational firmware based on the operational firmware data. When power is applied to the storage device 1000, the firmware controller 210 may load firmware data stored in the nonvolatile memory device 100, and store the firmware data as operational firmware data in the volatile memory device 220.

The firmware controller 210 may perform a firmware validity test for detecting whether the operational firmware data and the firmware data do not accord with each other, in response to a test event being detected.

When the operational firmware data and the firmware data do not accord with each other, the firmware controller 210 may perform a reset operation.

In an embodiment, the firmware controller 210 may provide the nonvolatile memory device 100 with a read command for commanding the nonvolatile memory device 100 to read the firmware data, in response to the test event, and store the firmware data loaded from the non-volatile memory device 100, separately from the operational firmware data, in the volatile memory device 200.

The volatile memory device 220 may store data only when power is applied to the storage device 1000.

In an embodiment, the volatile memory device 220 may store the operational firmware data.

In an embodiment, the volatile memory device 220 may store the firmware data loaded from the non-volatile memory device 100, separately from the operational firmware data. This will be described later with reference to FIG. 2.

The volatile memory device 220 may be included in the memory controller 200 as shown in FIG. 1. However, the present disclosure is not limited thereto, and the volatile memory device 220 may exist at the outside of the memory controller 200 according to a design method.

In an embodiment, the volatile memory device 220 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like.

In an embodiment, the volatile memory device 220 may be implemented as a tightly coupled memory (TCM). The TCM may mean a memory which only the firmware controller 210 having authority can access. For example, only a firmware controller having authority among a plurality of firmware controllers (not shown) may acquire data stored in the TCM, and a firmware controller having no authority may not acquire the data stored in the TCM.

The firmware controller having no authority may provide the firmware controller having authority with a request signal (not shown) for requesting the firmware controller having authority to transmit data, and acquire the data requested from the firmware controller having authority. This will be described later with reference to FIGS. 12 and 13.

The host 400 may communicate with the storage device 1000 through an interface (not shown).

The interface may be implemented as a serial advanced technology attachment (SATA) interface, a SATA express (SATAe) interface, a serial attached small computer system interface (SAS) interface, a peripheral component interconnect express (PCIe) interface, a non-volatile memory express (NVMe) interface, an advanced host controller interface (AHCI) interface, or a multimedia card interface.

The host 400 may store write data in the storage device 1000, or communicate with the storage device 1000 to acquire read data stored in the storage device 1000.

In an embodiment, the host 400 may provide the storage device 1000 with a write request for requesting the storage device 1000 to store write data. Also, the host 400 may provide the storage device 1000 with a write request, write data, and a logical address for identifying the write data.

The storage device 1000 may store the write data provided by the host 400 in the nonvolatile memory device 100 and provide the host 400 with a response that the storing of the write data has been completed, in response to the write request provided from the host 400.

In an embodiment, the host 400 may provide the storage device 1000 with a read request for requesting the storage device 1000 to provide data stored in the storage device 1000 to the host 400. Also, the host 400 may provide a read request and a read address to the storage device 1000.

The storage device 1000 may read, from the nonvolatile memory device 100, read data corresponding to the read address provided by the host 400 and provide the host 400 with the read data as a response to the read request, in response to the read request provided from the host 400.

Figure 2:
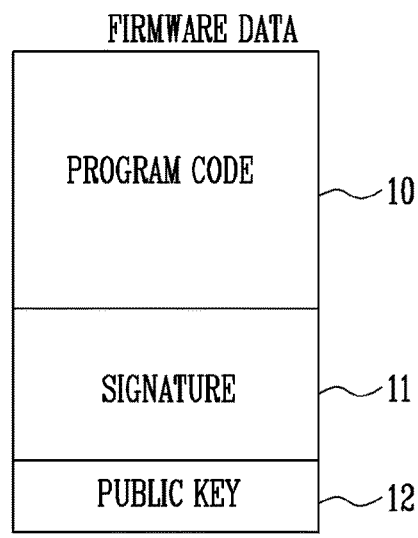
FIG. 2 is a diagram illustrating firmware data in accordance with an embodiment of the present disclosure.

FIG. 2 is a diagram illustrating firmware data in accordance with an embodiment of the present disclosure.

Referring to FIG. 2, the firmware data may include a program code 10, a signature 11, a public key 12.

The program code 10 may be a code for executing firmware.

For example, the program code may have an International Organization for Standardization (ISO) image file format.

The signature 11 may be an encoded message.

The public key 12 may be a key used for decryption in an RSA-PSS algorithm.

Although not shown in the drawing, a key used for encoding in the RSA-PSS algorithm may be a private key. The private key may be managed separately at the outside.

The signature 11 may be generated by encoding the encoded message through the private key and be decoded through the public key 12 to generate the encoded message. However, the present disclosure is not limited thereto, and the signature 11 may be generated by encoding the encoded message through the public key 12 and be decoded through the private key according to a design method. This will be described later with reference to FIG. 3.

A key for decoding the signature 11 may be defined as an authentication key. The authentication key may be the public key 12. Specifically, for example, when a signature is generated by encoding the encoded message based on a private key, an authentication key may be the public key 12.

In this specification, for convenience of description, i the signature 11 may be generated by encoding the encoded message through the private key and decoded through the authentication key or the public key 12.

Although not shown in the drawing, operational firmware data may include an operational program code, a signature, a private key, and a public key. The operational program code may be a code for executing operational firmware. In general, as long as the operational firmware data is not corrupted, the operational program code and the program code 10 are supposed to be the same as each other.

Figure 3:
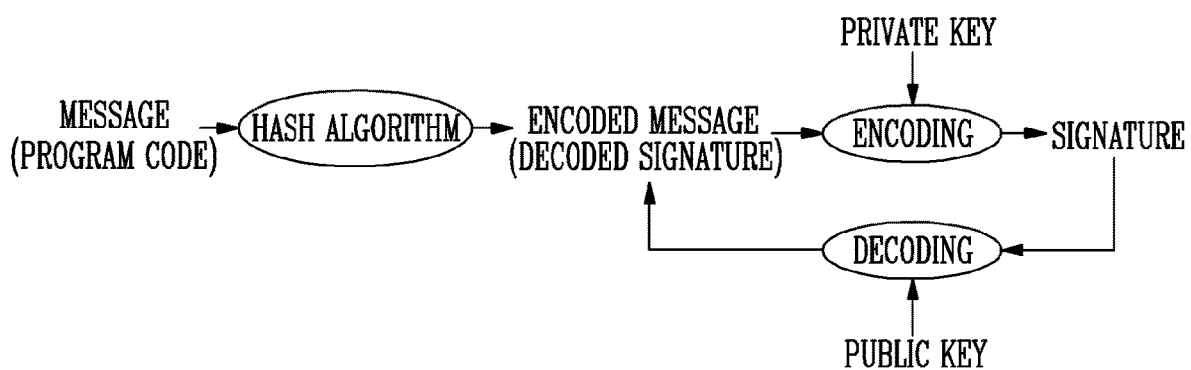
FIG. 3 is a diagram illustrating a method for generating an encoded message and a signature in accordance with an embodiment of the present disclosure.

FIG. 3 is a diagram illustrating a method for generating an encoded message and a signature in accordance with an embodiment of the present disclosure.

The diagram shown in FIG. 3 may be a diagram schematically illustrating the above-described RSA-PSS algorithm.

Referring to FIG. 3, a message may be encoded by using a hash algorithm.

Although not shown in the drawing, the hash algorithm may be an algorithm in which a hash value is generated based on a hash function using a message as an input, then an arbitrary message including the hash value is generated, and the hash function and a mask generation function (MGF) are applied to the arbitrary message and a data block, so that an encoded message is generated.

The message may be the program code and the encoded message may be the encoded program code.

The encoded message may be encoded by a private key and an encoding algorithm to generate the signature 11.

The signature 11 may be decoded by the public key 12 and a decoding algorithm to generate the decoded signature, i.e., the encoded message.

Although not shown in the drawing, an operational program code may be encoded to generate the encoded message through the hash algorithm.

Figure 4:
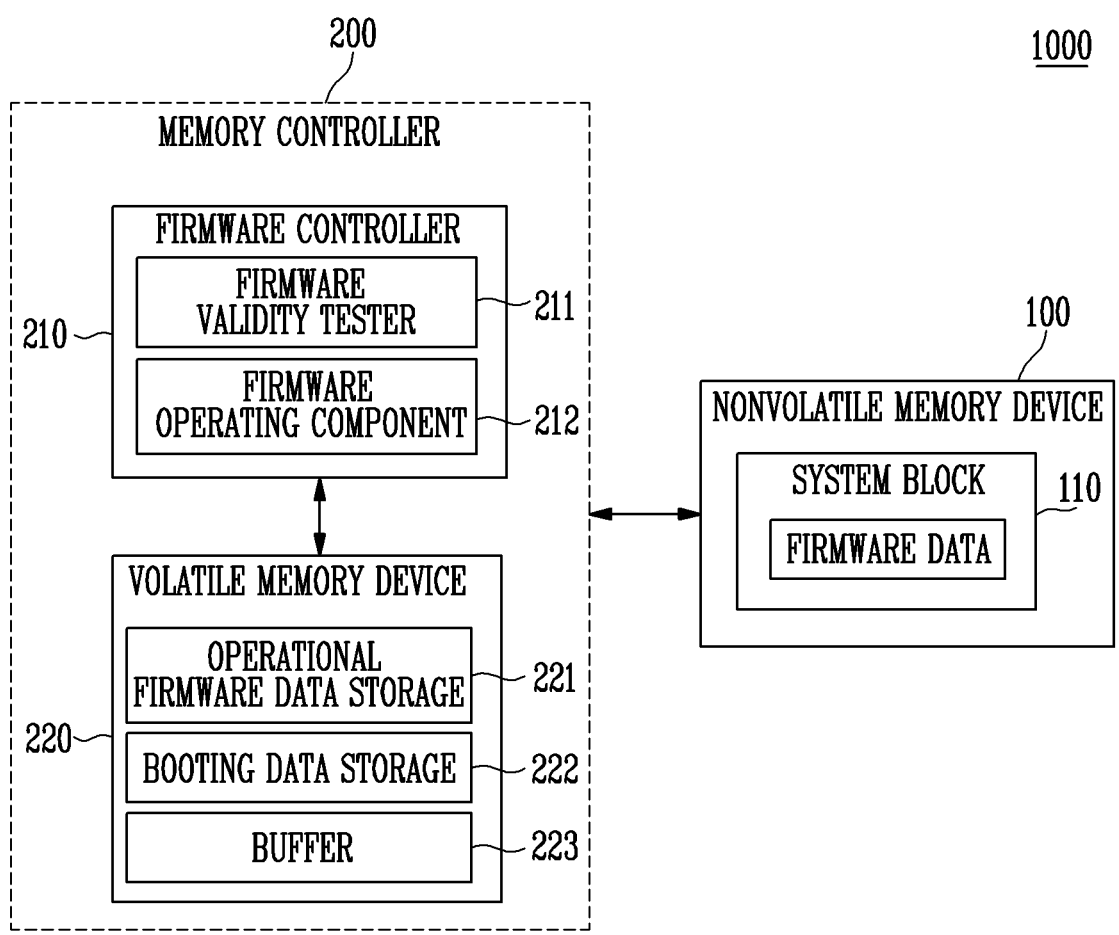
FIG. 4 is a diagram illustrating a storage device in accordance with an embodiment of the present disclosure.

FIG. 4 is a diagram illustrating a storage device in accordance with an embodiment of the present disclosure.

Referring to FIG. 4, the nonvolatile memory device 100 may include a system block 110, and the system block 110 may store firmware data.

The memory controller 200 may include a firmware controller 210 and a volatile memory device 220.

The firmware controller 210 may be implemented as hardware such as a processor.

The firmware controller 210 may include a firmware validity tester 211 and a firmware operating component 212.

The firmware validity tester 211 may perform a firmware validity test in response to a test event.

In general, the firmware data stored in the system block 110 may be valid data. The firmware validity tester 211 may load the firmware data stored in the system block 110 when power is applied to the storage device 1000 and test the validity of operational firmware based on the loaded firmware data when a test event occurs.

For example, the volatile memory device 220 may store a signature 11 and an authentication key (i.e., a public key) 12, which are loaded from the nonvolatile memory device 100, in response to the power being applied to the storage device 1000. The firmware validity tester 211 may detect whether an encoded message (i.e., the encoded operational program code) and a decoded signature (i.e., the encoded program code) do not accord with each other. The encoded message may be generated from an operational program code included in operational firmware data as described with reference to FIG. 3. The decoded signature may be generated based on the signature 11 and the authentication key (e.g., the public key 12 shown in FIG. 2) as described with reference to FIG. 3.

Specifically, for example, when the power is applied to the storage device 1000, the firmware validity tester 211 may store, in the volatile memory device 220, a signature 11 and an authentication key 12, which are included in the firmware data stored in the system block 110. The firmware validity tester 211 may receive an operational program code, the signature, and the authentication key, which are stored in the volatile memory device 220, in response to a test event. The firmware validity tester 211 may generate an encoded message (i.e., the encoded operational program code) and a decoded signature (i.e., the encoded program code). When the encoded message and the decoded signature do not accord with each other, the firmware validity tester 211 may provide the firmware operating component 212 with a discordance result. This will be described in detail later with reference to FIG. 5.

While the operational firmware is being executed, the firmware data stored in the system block 110 may be corrupted by a malicious attack or a memory bit flip. When a test event occurs, the firmware validity tester 211 may load the firmware data stored in the system block 110, verify reliability of the loaded firmware data and then test the validity of the operational firmware based on the firmware data of which the reliability is verified.

For example, the firmware validity tester 211 may verify reliability of firmware data stored in the volatile memory device 220 and verify whether a program code included in the firmware data of which the reliability is verified and an operational program code included in the operational firmware data do not accord with each other. The volatile memory device 220 may store the firmware data loaded from the nonvolatile memory device 100 in response to the test event being detected.

Specifically, for example, the firmware validity tester 211 may store, in the volatile memory device 220, the firmware data stored in the system block 110 in response to the test event. The firmware validity tester 211 may verify reliability of the firmware data stored in the volatile memory device 220. When the reliability of the firmware data stored in the volatile memory device 220 is verified, the firmware validity tester 211 may extract an operational program code from operation firmware data stored in the volatile memory device 220. When a program code of the firmware data of which the reliability is verified and an operational program code included in the operational firmware data do not accord with each other, the firmware validity tester 211 may provide the firmware operating component 212 with a discordance result. This will be described in detail later with reference to FIG. 6.

The firmware validity tester 211 may be implemented as a program or software for testing validity of firmware in the firmware controller 210. However, the present disclosure is not limited thereto, and the firmware validity tester 211 may be implemented as a hardware module for performing an operation of testing validity of firmware. Although not shown in the drawing, the firmware validity tester 211 may exist at the outside of the firmware controller 210, when the firmware validity tester 211 is implemented as a hardware module.

The firmware operating component 212 may execute operational firmware. The firmware operating component 212 may reset the operational firmware, i.e., may change operational firmware which is being currently executed to a firmware corresponding to the firmware data stored in the system block 110 and execute the reset operational firmware, i.e., the changed firmware, in response to the discordance result provided from the firmware validity tester 211.

The volatile memory device 220 may include an operational firmware data storage 221, a booting data storage 222, and a buffer 223.

Operational firmware data may be stored in the operational firmware data storage 221. Specifically, when the power is applied to the storage device 1000, the firmware data stored in the system block 110 may be stored as the operational firmware data in the operation firmware data storage 221.

A signature and an authentication key, which are included in the firmware data stored in the system block 110 may be stored in the booting data storage 222 when the power is applied to the storage device 1000. The signature and the authentication key, which are stored in the booting data storage 222 are supposed to stay the same as the signature and the authentication key stored in the system block 110 and therefore may not be corrupted.

The firmware data stored in the nonvolatile memory device 100 may be stored in the buffer 223 after the power is applied to the storage device 1000.

The firmware controller 210 shown in FIG. 4 may be configured with one or more firmware controllers. Each of the firmware controllers may autonomously perform a firmware validity test on corresponding operational firmware while executing the corresponding operational firmware.

Figure 5:
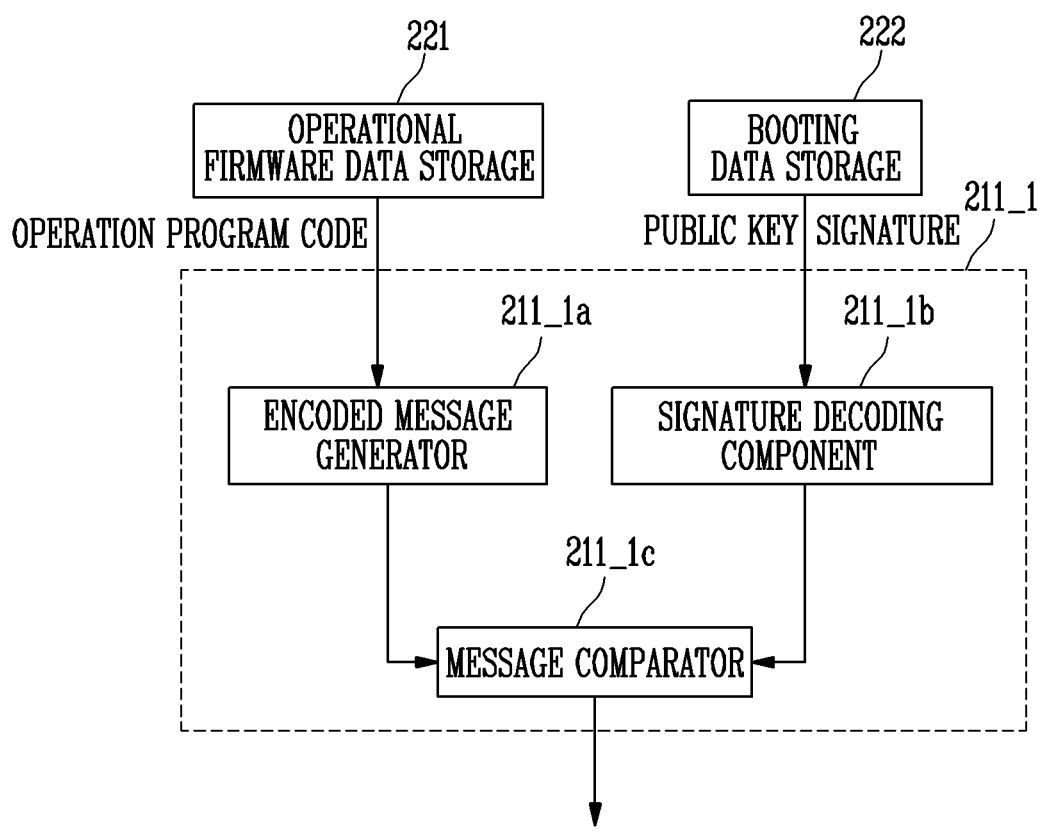
FIG. 5 is a diagram illustrating a first embodiment of a firmware validity tester shown in FIG. 4.

FIG. 5 is a diagram illustrating a first embodiment of the firmware validity tester 211 shown in FIG. 4.

Referring to FIG. 5, a firmware validity tester 211_1 shown in FIG. 5 may correspond to the firmware validity tester 211 and may include an encoded message generator 211_1a, a signature decoding component 211_1b, and a message comparator 211_1c.

The encoded message generator 211_1a may generate an encoded message based on an operational program code provided from the operational firmware data storage 221.

The encoded message may be a message generated by applying a hash algorithm to the operational program code, as described above with reference to FIG. 3.

The encoded message generator 211_1a may provide the encoded message to the message comparator 211_1c.

The signature decoding component 211_1b may output a decoded signature by using a signature and a public key, which are provided from the booting data storage 222. As described above, the signature and the authentication key stored in the booting data storage 222 may stay the same as the signature and the authentication key stored in the system block 110 and therefore may not be corrupted.

The decoded signature may be an encoded message. The signature decoding component 211_1b may decrypt the signature by using the public key, as described above with reference to FIG. 3.

The signature decoding component 211_1b may provide the decoded signature to the message comparator 211_1c.

The message comparator 211_1c may output a discordance result in response to the encoded message and the decoded signature not according with each other.

Figure 6:
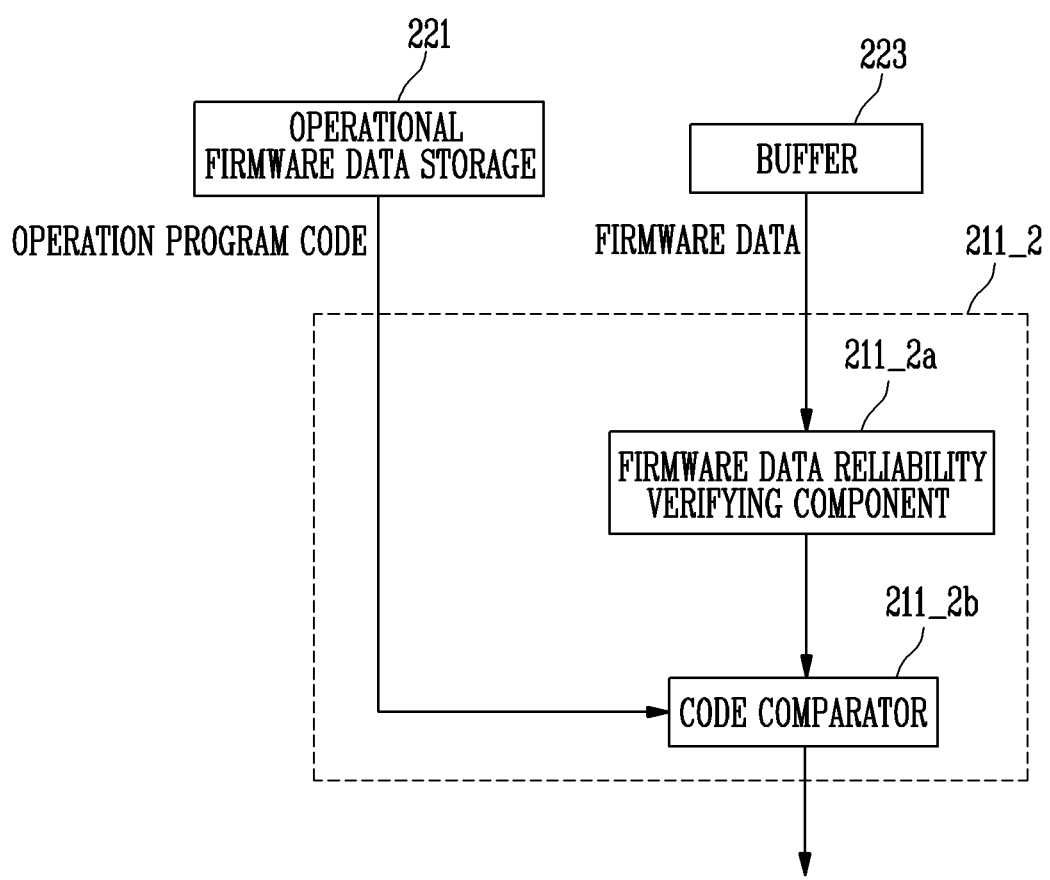
FIG. 6 is a diagram illustrating a second embodiment of the firmware validity tester shown in FIG. 4.

FIG. 6 is a diagram illustrating a second embodiment of the firmware validity tester 211 shown in FIG. 4.

Referring to FIG. 6, a firmware validity tester 211_2 shown in FIG. 6 may correspond to the firmware validity tester 211 and may include a firmware data reliability verifying component 211_2a and a code comparator 211_2b.

The firmware data reliability verifying component 211_2a may verify reliability of firmware data provided from the buffer 223. As described above, the firmware data stored in the system block 110 may be stored in the buffer 223 after the power is applied to the storage device 1000.

Specifically, the firmware data reliability verifying component 211_2a may acquire a program code from the firmware data stored in the buffer 223. Also, the firmware data reliability verifying component 211_2a may generate an encoded message by applying a hash algorithm to the acquired program code as described above with reference to FIG. 3. The firmware data reliability verifying component 211_2a may acquire a signature and an authentication key from the firmware data stored in the buffer 223. Also, the firmware data reliability verifying component 211_2a may generate a decoded signature by decoding the signature, using the authentication key, as described above with reference to FIG. 3. The firmware data reliability verifying component 211_2a may verify reliability of the firmware data stored in the buffer 223 according to whether the encoded message and the decoded signature accord with each other.

When the encoded message and the decoded signature accord with each other, the firmware data reliability verifying component 211_2a may extract the program code from the firmware data of which the reliability is verified and provide the extracted program code to the code comparator 211_2b.

The code comparator 211_2b may output a discordance result in response to the program code provided from the firmware data reliability verifying component 211_2a and the operational program code provided from the operational firmware data storage 221 not according with each other.

Figure 7:
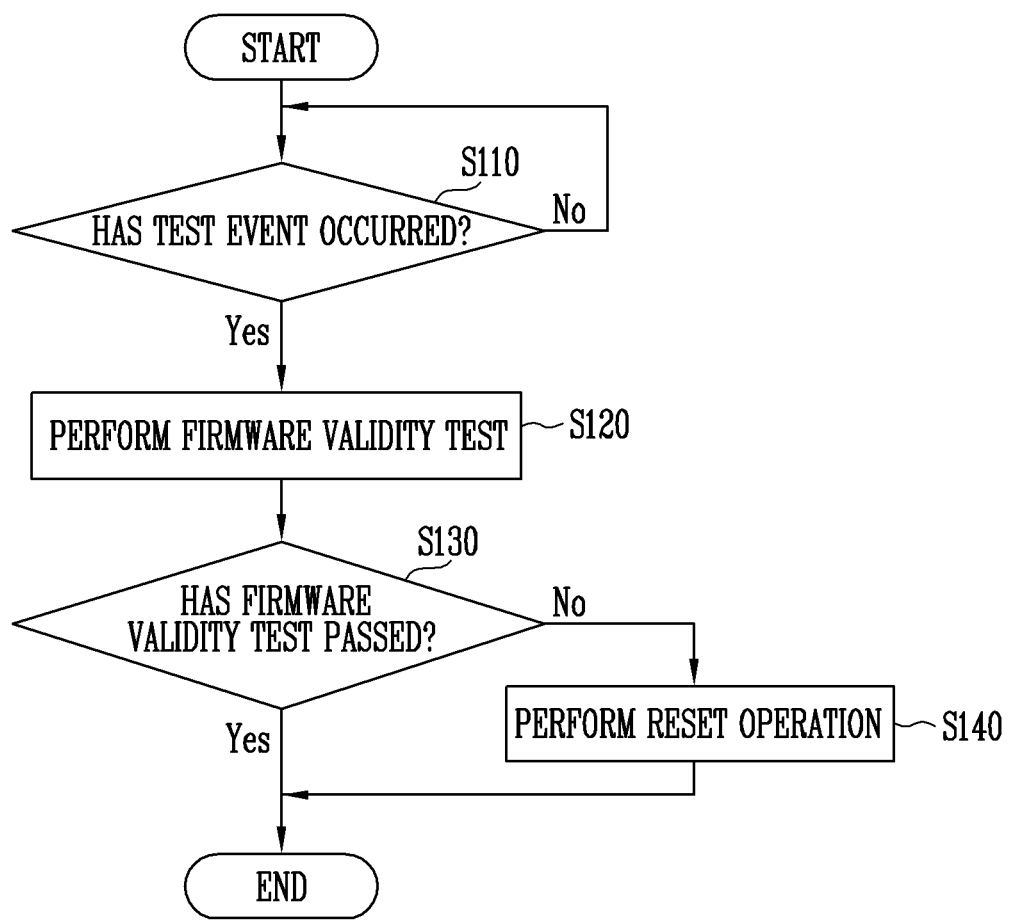
FIG. 7 is a flowchart illustrating an operating method of the storage device in accordance with an embodiment of the present disclosure.

FIG. 7 is a flowchart illustrating an operating method of the storage device in accordance with an embodiment of the present disclosure.

Referring to FIG. 7, the storage device 1000 detects whether a test event has occurred (S110). For example, the memory controller 200 included in the storage device 1000 is supplied with power to store firmware data stored in the system block 110 as operational firmware data in the volatile memory device 220. In addition, when the state of the memory controller 200 is an idle state, the memory controller 200 may detect the idle state as the test event.

When the test event does not occur (S110, NO), the step S110 is performed.

When the test event occurs (S110, YES), the storage device 1000 performs a firmware validity test (S120). For example, the memory controller 200 included in the storage device 1000 may perform the firmware validity test since the test event is detected.

The storage device 1000 determines whether the firmware validity test has passed (S130). When the firmware validity test has passed may mean that validity of operational firmware has been verified.

When the firmware validity test does not pass (S130, NO), the storage device 1000 performs a reset operation (S140).

When the firmware validity test passes (S130, YES), the storage device 1000 ends the firmware validity test.

Figure 8:
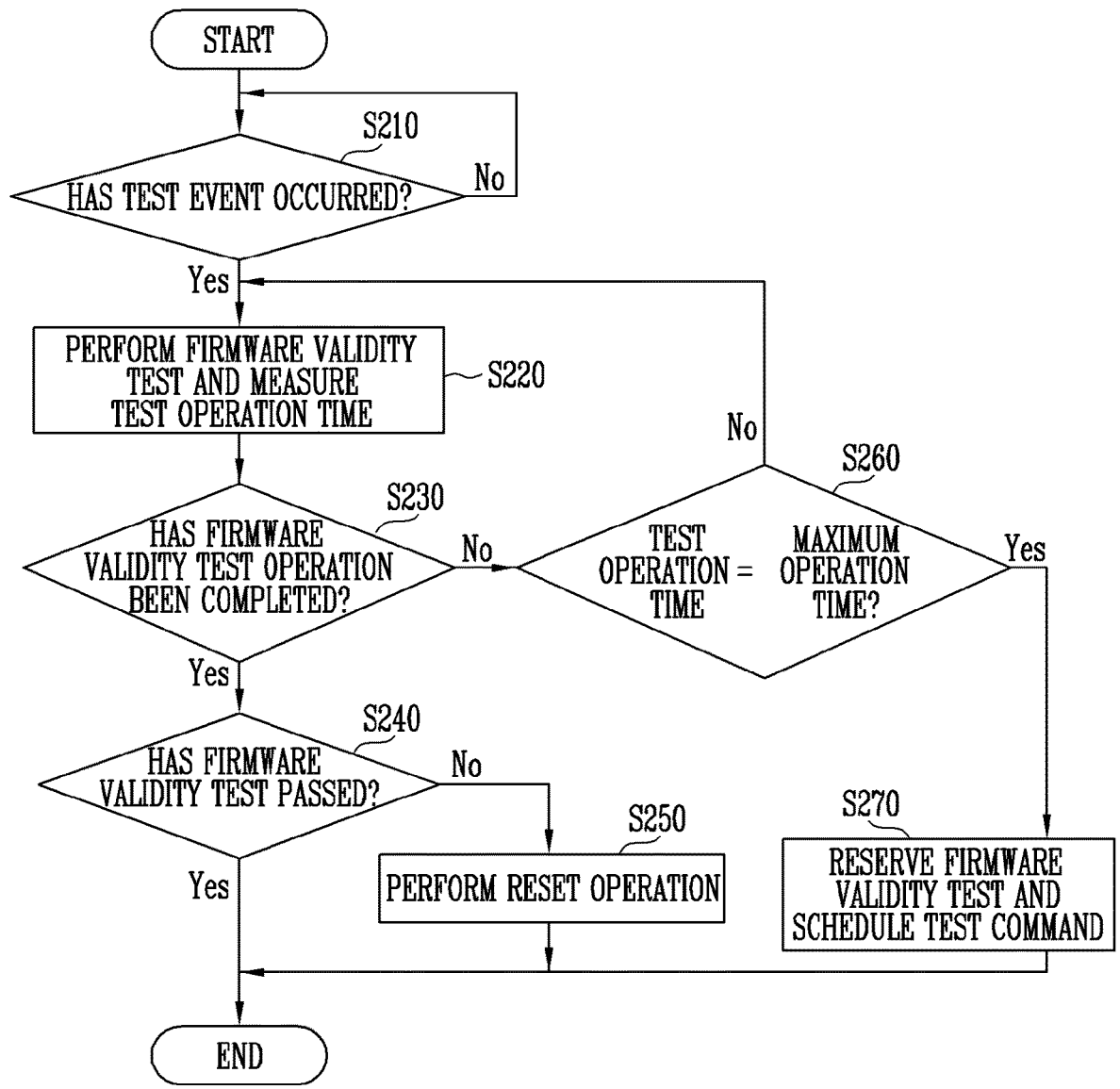
FIG. 8 is a flowchart illustrating in detail an operating method of the storage device in accordance with an embodiment of the present disclosure.

FIG. 8 is a flowchart illustrating an operating method of the storage device in accordance with an embodiment of the present disclosure.

Referring to FIG. 8, identically to the operation S110 shown FIG. 7, the storage device 1000 detects whether a test event has occurred (S210), and the operation S210 is performed when the test event does not occur (S210, NO).

When the test event occurs (S210, YES), the storage device 1000 performs a firmware validity test and measures a test operation time (S220). For example, the memory controller 200 included in the storage device 1000 may measure a test operation time or an amount of time taken for the memory controller 200 to perform the firmware validity test.

The storage device 1000 determines whether a firmware validity test operation has been completed (S230).

When the firmware validity test operation has been completed may mean that a performance result of the firmware validity test has been generated. The performance result may be a result representing that the firmware validity test has passed or a result representing that the firmware validity test has not passed.

When the firmware validity test operation is completed (S230, YES), the storage device 1000 determines whether the firmware validity test has passed (S240). When the firmware validity test does not pass (S240, NO), the storage device 1000 performs a reset operation (S250). When the firmware validity test passes (S240, YES), the storage device 1000 ends the firmware validity test.

When the firmware validity test operation is not completed (S230, NO), the storage device 1000 determines whether the test operation time has reached a predetermined maximum operation time (S260).

When the test operation time does not reach the maximum operation time (S260, NO), the operation S220 is performed.

When the test operation time reaches the maximum operation time (S260, YES), the storage device 1000 reserves the firmware validity test, and schedules a test command (S270). For example, the memory controller 200 included in the storage device 1000 may reserve the firmware validity test in response to the test operation time reaching the maximum operation time. Also, the memory controller 200 may store the test command according to a predetermined scheduling order, in response to that the firmware validity test has been reserved. When the test command is stored, the memory controller 200 may detect the test event according to whether the stored test command is to be output according to the scheduling order.

Figure 9:
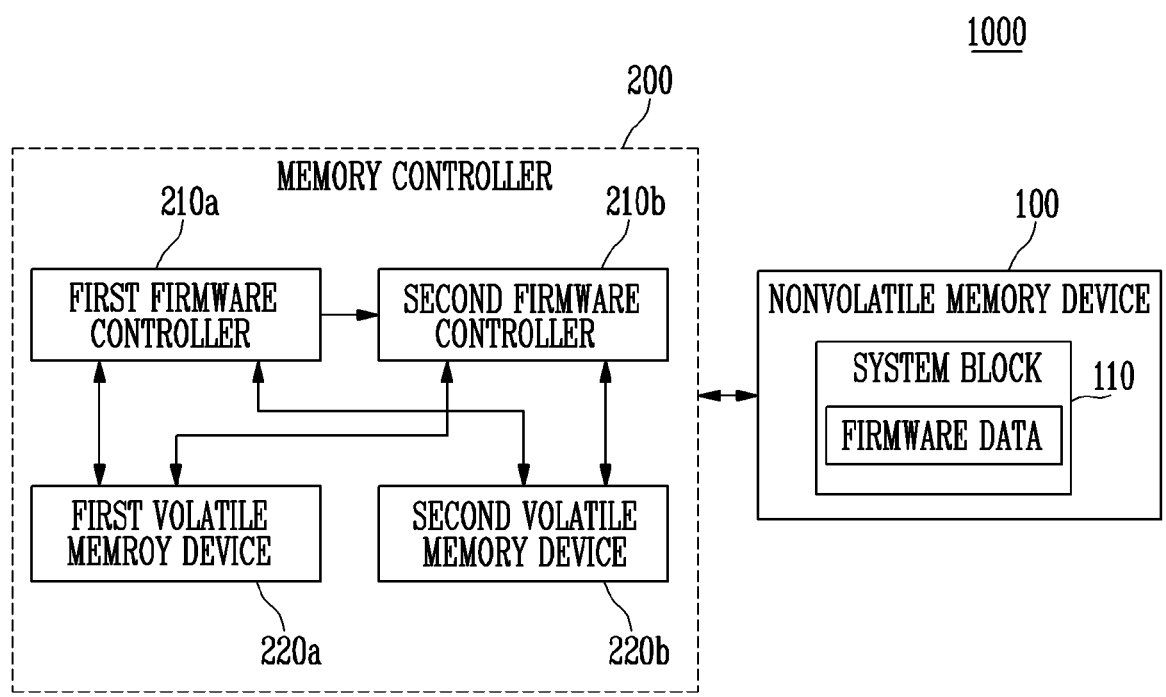
FIG. 9 is a diagram illustrating a storage device in accordance with another embodiment of the present disclosure.

FIG. 9 is a diagram illustrating a storage device in accordance with another embodiment of the present disclosure.

Referring to FIG. 9, the storage device 1000 shown in FIG. 9 may include a nonvolatile memory device 100 and a memory controller 200.

The nonvolatile memory device 100 may be the same as described above with reference to FIG. 1.

The controller 200 shown in FIG. 9 may include a plurality of firmware controllers as described above with reference to FIG. 4. Also, the memory controller 200 shown in FIG. 9 may perform the operating method in accordance with the embodiments shown in FIGS. 1 to 8.

However, unlike the firmware controller 210 shown in FIG. 4, one firmware controller among the plurality of firmware controllers may perform a firmware validity test on the other firmware controllers except the one firmware controller among the plurality of firmware controllers. That is, the one firmware controller does not perform a firmware validity test on operational firmware executed thereby but may test validity of operational firmware executed by each of the other firmware controllers.

In an embodiment, one firmware controller among the plurality of firmware controllers does not execute operational firmware but may perform only a firmware validity test on the other firmware controllers among the plurality of firmware controllers.

Hereinafter, in the embodiment shown in FIG. 9, portions different from those of the embodiment shown in FIG. 4 will be mainly described. For convenience of description, a number of the plurality of firmware controllers included in the memory controller 200 shown in FIG. 9 is two.

The memory controller 200 shown in FIG. 9 may include a first firmware controller 210a, a second firmware controller 210b, a first volatile memory device 220a, and a second volatile memory device 220b.

The first firmware controller 210a and the second firmware controller 210b may execute operational firmware based on operational firmware data stored in the first volatile memory device 220a and the second volatile memory device 220b, respectively.

The operational firmware executed by the first firmware controller 210a may be executed based on operational firmware data stored in the first volatile memory device 220a. To this end, the first firmware controller 210a may have access authority to the first volatile memory device 220a.

The operational firmware executed by the second firmware controller 210b may be executed based on operational firmware data stored in the second volatile memory device 220b. To this end, the second firmware controller 210b may have access authority to the second volatile memory device 220b.

The first firmware controller 210a may test validity of the operational firmware executed by the second firmware controller 210b in response to a test event. To this end, the first firmware controller 210a may acquire operational firmware data of the operational firmware executed by the second firmware controller 210b.

In an embodiment, when the second volatile memory device 220b is a DRAM or SRAM, the first firmware controller 210a may access the second volatile memory device 220b without any special authority.

In an embodiment, when the second volatile memory device 220b is a TCM, the first firmware controller 210a may have no authority with which the first firmware controller 210a can access the second volatile memory device 220b. The first firmware controller 210a may provide a request signal to the second firmware controller 210b, and acquire, from the second firmware controller 210b, the operational firmware data of the operational firmware executed by the second firmware controller 210b. To this end, the first firmware controller 210a may communicate with the second firmware controller 210b through an interface (not shown).

When a firmware validity test on the second firmware controller 210b does not pass, the first firmware controller 210a may perform a reset operation on the operational firmware data of the operational firmware executed by the second firmware controller 210b.

In an embodiment, the first firmware controller 210 may control the second firmware controller 210b to suspend an operation corresponding to a request provided from the host 400, before the reset operation is performed.

The second firmware controller 210b may test validity of the operational firmware executed by the first firmware controller 210a. To this end, the second firmware controller 210b may acquire operational firmware data of the operational firmware executed by the first firmware controller 210a.

In an embodiment, when the first volatile memory device 220a is a DRAM or SRAM, the second firmware controller 210b may access the first volatile memory device 220a without any special authority.

In an embodiment, when the first volatile memory device 220a is a TCM, the second firmware controller 210b may have no authority with which the second firmware controller 210b can access the first volatile memory device 220a. The second firmware controller 210b may provide a request signal to the first firmware controller 210a and acquire the operational firmware data of the operational firmware executed by the first firmware controller 210a. To this end, the second firmware controller 210b may communicate with the first firmware controller 210a through the interface (not shown).

When a firmware validity test on the first firmware controller 210a does not pass, the second firmware controller 210b may perform a reset operation on the operational firmware data of the operational firmware executed by the first firmware controller 210a.

In an embodiment, the second firmware controller 210b may control the first firmware controller 210a to suspend an operation corresponding to a request provided from the host 400, before the reset operation is performed.

The first volatile memory device 220a may store the operational firmware data of the operational firmware executed by the first firmware controller 210a. The first volatile memory device 220a may store a signature and an authentication key of firmware data stored in a system block 110 when power is applied to the storage device 1000. The first volatile memory device 220a may store the firmware data loaded from the nonvolatile memory device 100 after the power is applied to the storage device 1000.

The second volatile memory device 220b may store the operational firmware data of the operational firmware executed by the second firmware controller 210b. The second volatile memory device 220b may store the signature and the authentication key of the firmware data stored in the system block 110 when the power is applied to the storage device 1000. The second volatile memory device 220b may store the firmware data loaded from the nonvolatile memory device 100 when the power is applied to the storage device 1000.

Hereinafter, the second firmware controller 210b performs the firmware validity test on the operational firmware data of the operational firmware executed by the first firmware controller 210a.

In an embodiment, when the power is applied to the storage device 1000, the first firmware controller 210a may store firmware data as the operational firmware data in the first volatile memory device 220a, and execute the operational firmware. The second firmware controller 210b may perform a firmware validity test for detecting whether the operational firmware data acquired from the first volatile memory device 220a and the firmware data stored in the second volatile memory device 220b do not accord with each other, in response to the test event being detected. The second firmware controller 210b may perform a reset operation on the operational firmware data of the operational firmware executed by the first firmware controller 210a based on a result obtained by performing the firmware validity test. This will be described in detail later with reference to FIGS. 10 and 11.

In an embodiment, when the power is applied to the storage device 1000, the first firmware controller 210a may store firmware data as the operational firmware data in the first volatile memory device 220a, and execute the operational firmware. The second firmware controller 210b may provide the first firmware controller 210a with a request signal for requesting the first firmware controller 210a to transmit the operational firmware data in response to the test event being detected, perform a firmware validity test for detecting whether the operational firmware data provided from the first firmware controller 210a and the firmware data stored in the second volatile memory device 220b do not accord with each other, and perform a reset operation on the operational firmware data of the operational firmware executed by the first firmware controller 210a based on a result obtained by performing the firmware validity test. This will be described in detail later with reference to FIGS. 12 and 13.

Figure 10:
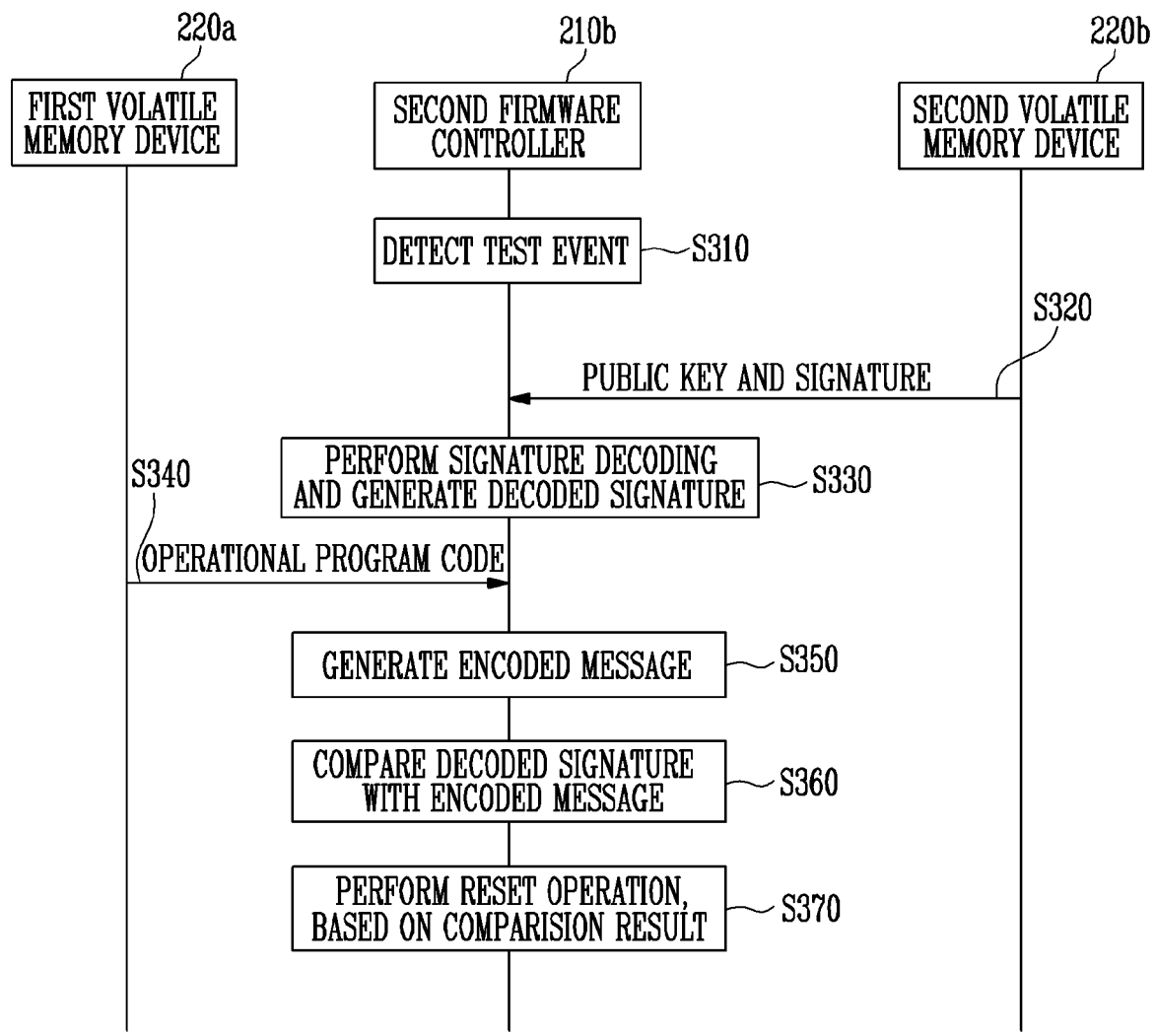
FIG. 10 is a diagram illustrating a first embodiment of a second firmware controller shown in FIG. 9.

FIG. 10 is a diagram illustrating a first embodiment of the second firmware controller shown in FIG. 9.

Referring to FIG. 10, the second firmware controller 210b may detect a test event (S310).

The second firmware controller 210b may be receive a public key and a signature, which are provided from the second volatile memory device 220b, in response to the test event (S320). The second volatile memory device 220b may store a signature and a public key, which are loaded from the nonvolatile memory device 100, in response to power being applied to the storage device 1000.

The second firmware controller 210b may generate a decoded signature based on the signature and an authentication key, which are loaded from the second volatile memory device 220b (S330). The decoded signature may be generated by using the same method as described above with reference to FIG. 5.

The second firmware controller 210b may receive an operational program code included in operational firmware data, which is provided from the first volatile memory device 220a (S340). The operational program code may be a code for executing operational firmware executed by the first firmware controller 210a.

The second firmware controller 210b may generate an encoded message based on the operational program code (S350). The encoded message may be generated by using the same method as described above with reference to FIG. 3.

The second firmware controller 210b may compare the decoded signature with the encoded message (S360) and perform a reset operation on the operational firmware data of the operational firmware executed by the first firmware controller 210a based on a comparison result (S370). For example, the second firmware controller 210b may control the first firmware controller 210a to change the operational firmware executed by the first firmware controller 210a to a firmware corresponding to the firmware data stored in the system block 110 and to execute the changed firmware, according to whether the decoded signature and the encoded message do not accord with each other.

Figure 11:
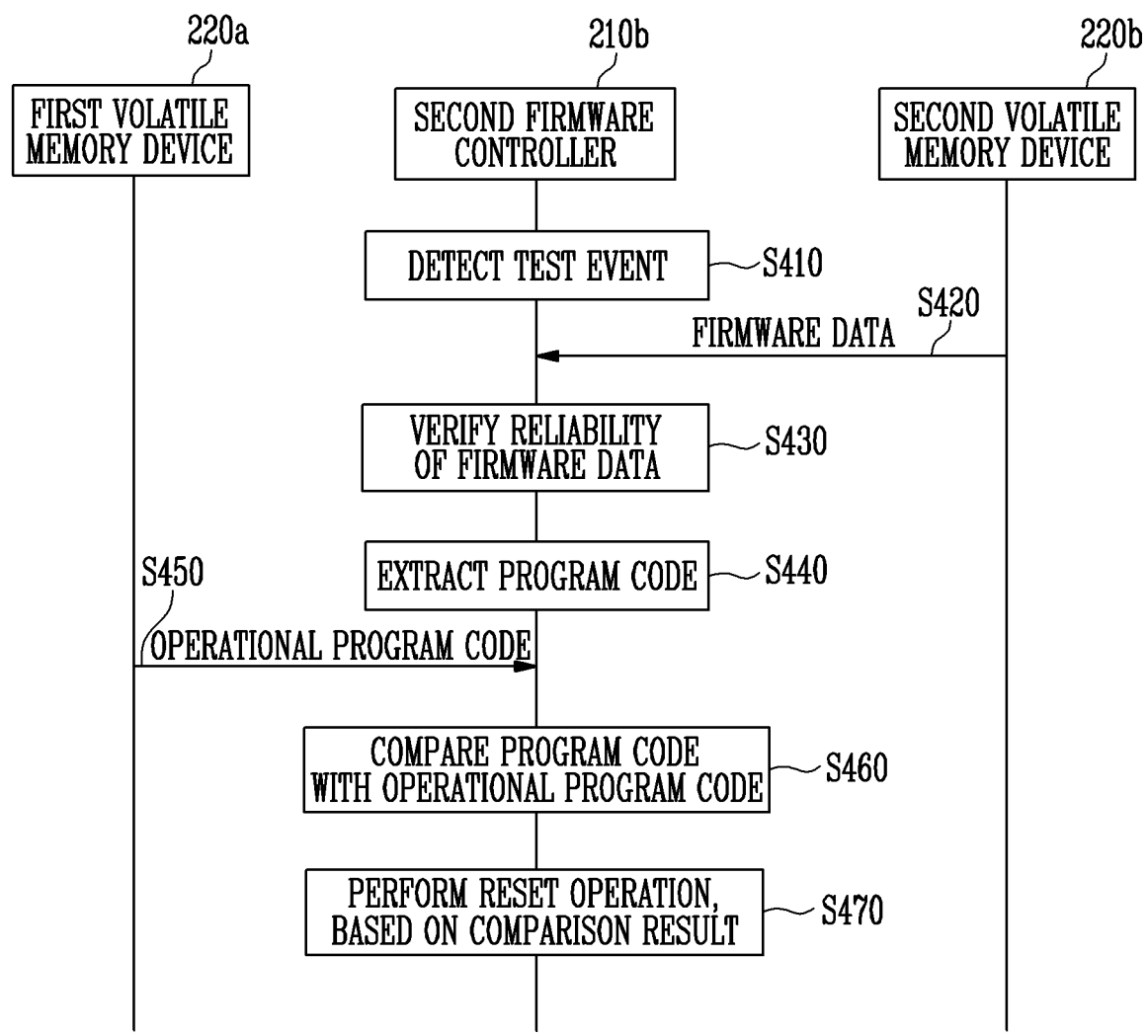
FIG. 11 is a diagram illustrating a second embodiment of the second firmware controller shown in FIG. 9.

FIG. 11 is a diagram illustrating a second embodiment of the second firmware controller shown in FIG. 9.

Referring to FIG. 11, the second firmware controller 210b may detect a test event (S410).

The second firmware controller 210b may receive firmware data provided from the second volatile memory device 220b in response to the test event (S420). The second volatile memory device 220b may store firmware data loaded from the nonvolatile memory device 100 in response to the test event being detected.

The second firmware controller 210b may verify reliability of the firmware data provided from the second volatile memory device 220b (S430) and extract a program code from the firmware data of which the reliability is verified (S440).

For example, the second firmware controller 210b may generate an encoded message based on the program code included in the firmware data provided from the second volatile memory device 220b. The second firmware controller 210b may generate a decoded signature based on a signature and an authentication key, which are included in the firmware data from the second volatile memory device 220b. The second firmware controller 210b may verify the reliability of the firmware data according to whether the encoded message and the decoded signature accord with each other. When the encoded message and the decoded signature accord with each other, the second firmware controller 210b may extract the program code from the firmware data of which the reliability is verified in response to the reliability of the firmware data being verified.

The second firmware controller 210b may receive an operational program code included in operational firmware data, which is provided from the first volatile memory device 220a (S450). The operational program code may be a code for executing operational firmware executed by the first firmware controller 210a.

The second firmware controller 210b may compare the program code included in the firmware data of which the reliability is verified with the operational program code included in the operational firmware data (S460) and perform a reset operation on the operational firmware data of the operational firmware executed by the first firmware controller 210a based on a comparison result (S470). For example, the second firmware controller 210b may control the first firmware controller 210a to change the operational firmware executed by the first firmware controller 210a to firmware corresponding to the firmware data stored in the system block 110 and to execute the changed firmware, according to whether the program code and the operational program code do not accord with each other.

Figure 12:
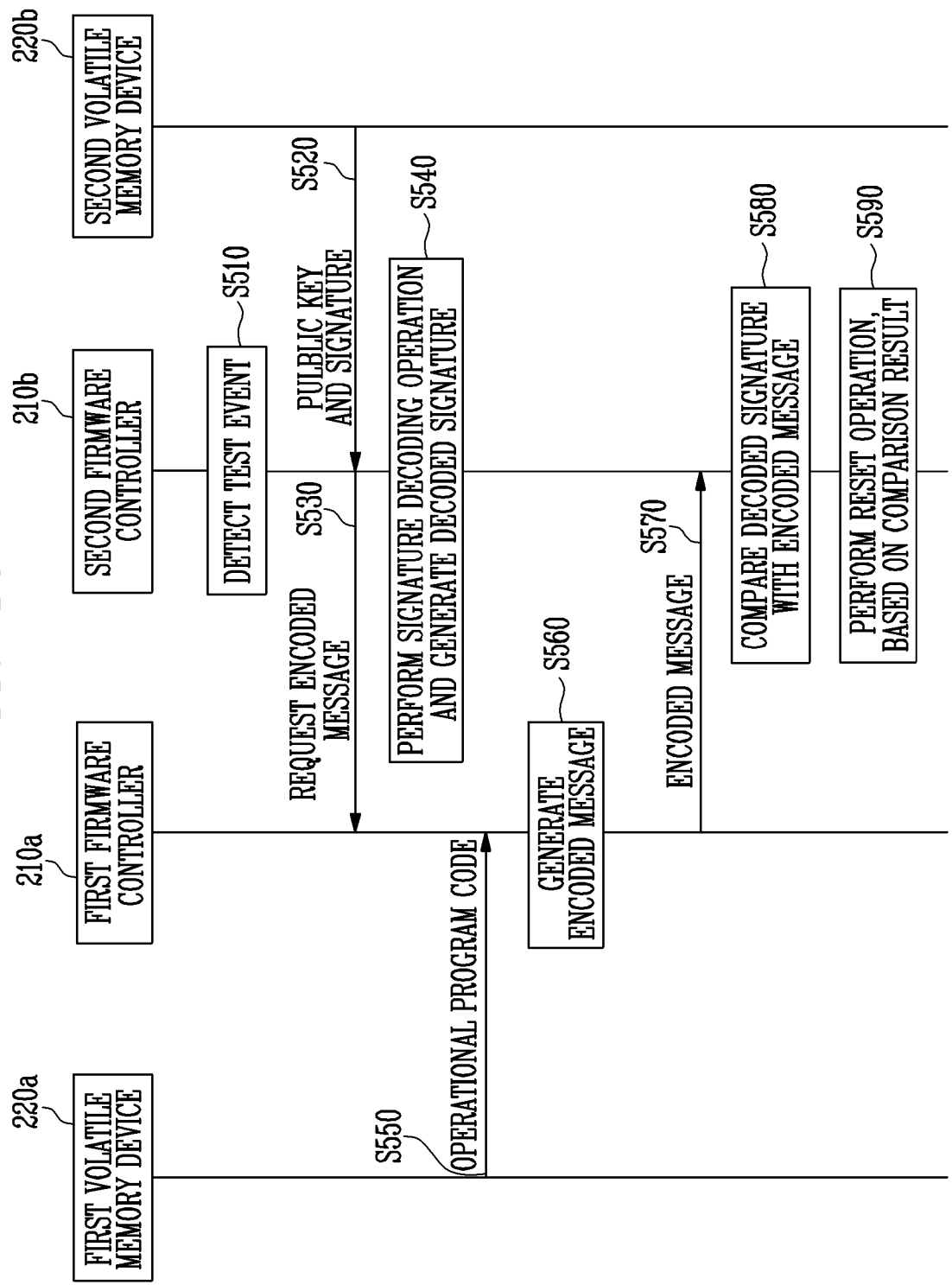
FIG. 12 is a diagram illustrating a third embodiment of the second firmware controller shown in FIG. 9.

FIG. 12 is a diagram illustrating a third embodiment of the second firmware controller shown in FIG. 9.

Referring to FIG. 12, the second firmware controller 210b may detect a test event (S510).

The second firmware controller 210b may receive a public key and a signature, which are provided from the second volatile memory device 220b, in response to the test event (S520). The second volatile memory device 220b may store a signature and an authentication key, which are loaded from the nonvolatile memory device 100, in response to power being applied to the storage device 1000.

The second firmware controller 210b may provide the first firmware controller 210a with a request signal for requesting an encoded message (S530).

The second firmware controller 210b may generate a decoded signature based on the signature and an authentication key, which are provided from the second volatile memory device 220b (S540). The decoded signature may be generated by using the same method as described above with reference to FIG. 5.

The first firmware controller 210a may receive an operational program code included in operational firmware data, which is provided from the first volatile memory device 220a, in response to the request signal (S550), generate an encoded message based on the operational program code (S560), and transmit the encoded message to the second firmware controller 210b (S570). The encoded message may be generated by using the same method as described above with reference to FIG. 3.

The second firmware controller 210b may compare the decoded signature with the encoded message (S580) and perform a reset operation on the operational firmware data of the operational firmware executed by the first firmware controller 210a based on a comparison result (S590).

Figure 13:
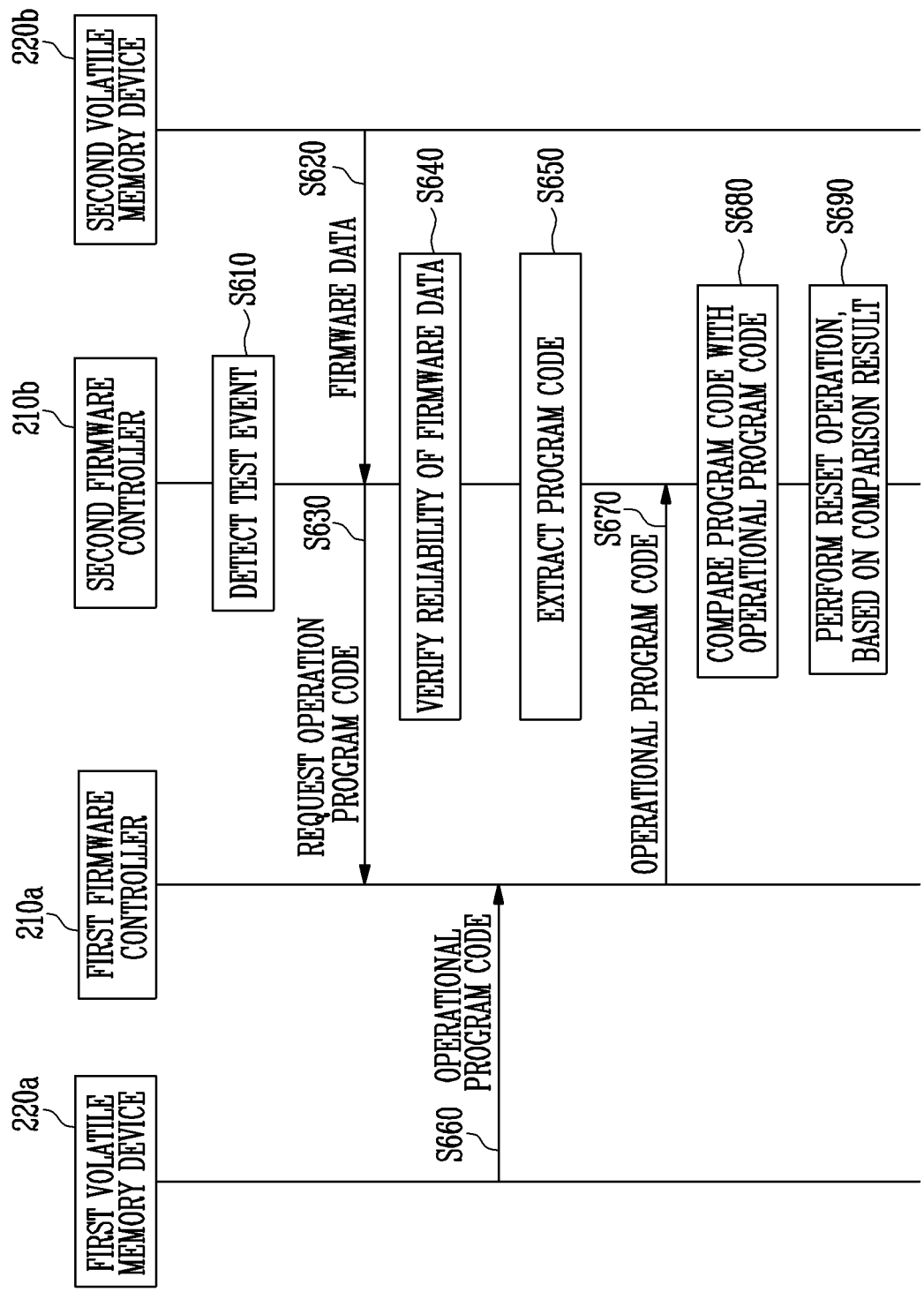
FIG. 13 is a diagram illustrating a fourth embodiment of the second firmware controller shown in FIG. 9.

FIG. 13 is a diagram illustrating a fourth embodiment of the second firmware controller shown in FIG. 9.

Referring to FIG. 13, the second firmware controller 210b may detect a test event (S610).

The second firmware controller 210b may receive firmware data provided from the second volatile memory device 220b in response to the test event (S620). The second volatile memory device 220b may store firmware data loaded from the nonvolatile memory device 100 in response to the test event being detected.

The second firmware controller 210b may provide the first firmware controller 210a with a request signal for requesting an operational program code (S630).

The second firmware controller 210b may verify reliability of the firmware data provided from the second volatile memory device 220b (S640) and extract a program code from the firmware data of which the reliability is verified (S650).

The reliability of the firmware data may be verified by using the same method as described above with reference to FIG. 6. For example, the second firmware controller 210b may generate an encoded message based on the program code included in the firmware data provided from the second volatile memory device 220b. The second firmware controller 210b may generate a decoded signature based on a signature and an authentication key, which are included in the firmware data from the second volatile memory device 220b. The second firmware controller 210b may verify the reliability of the firmware data according to whether the encoded message and the decoded signature accord with each other. When the encoded message and the decoded signature accord with each other, the second firmware controller 210b may extract the program code from the firmware data of which the reliability is verified, in response to the reliability of the firmware data being verified.

The first firmware controller 210a may receive an operational program code included in the operation firmware data, which is provided from the first volatile memory device 220a, in response to the request signal (S660), and transmit the operational program code to the second firmware controller 210b (S670).

The second firmware controller 210b may compare the program code included in the firmware data of which the reliability is verified with the operational program code included in the operational firmware data (S680) and perform a reset operation on the operational firmware data of the operational firmware executed by the first firmware controller 210a based on a comparison result (S690). For example, the second firmware controller 210b may control the first firmware controller 210a to change operational firmware executed by the first firmware controller 210a to firmware corresponding to the firmware data stored in the system block 110 and to execute the changed firmware, according to whether the program code and the operational program code do not accord with each other.

Figure 14:
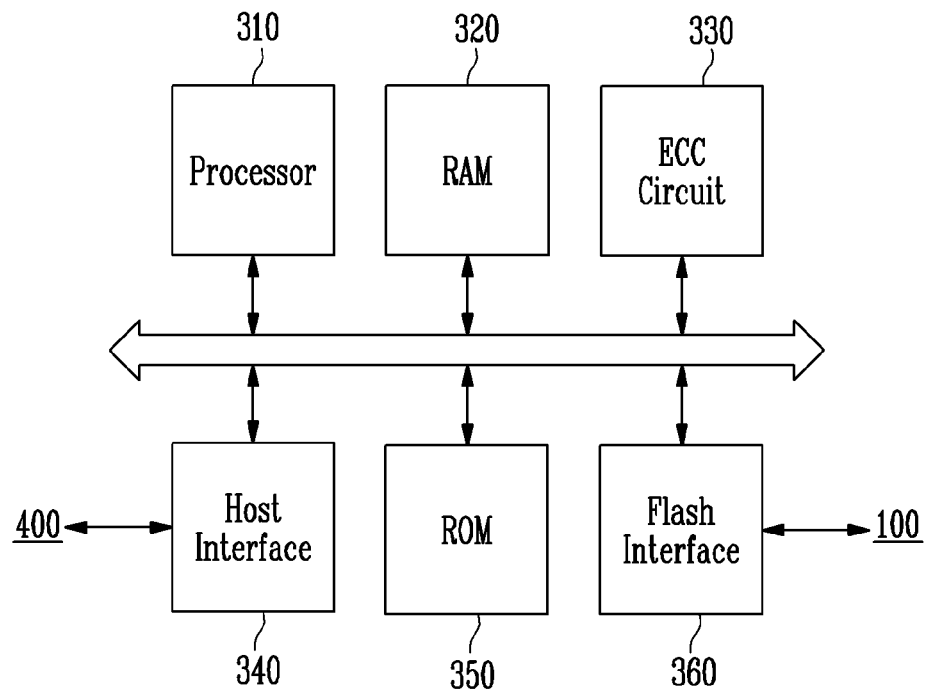
FIG. 14 is a diagram illustrating a memory controller in accordance with an embodiment of the present disclosure.

FIG. 14 is a diagram illustrating a memory controller in accordance with an embodiment of the present disclosure.

Referring to FIG. 14, the memory controller 300 shown in FIG. 14 may perform the same function as the memory controller 200 shown in FIG. 1.

The memory controller 300 may include a processor 310, a RAM 320, an error correction code (ECC) circuit 330, a host interface 340, a ROM 350, and a flash interface 360.

The processor 310 may control overall operations of the memory controller 300.

The RAM 320 may be used as a buffer memory, a cache memory, a working memory, etc. of the memory controller 300. The RAM 320 may be a buffer memory.

The ECC circuit 330 may generate an ECC for correcting a fail bit or error bit of data received from the nonvolatile memory device 100.

The ECC circuit 330 may generate data to which a parity bit is added by performing ECC encoding of data provided to the nonvolatile memory device 100. The parity bit (not shown) may be stored in the nonvolatile memory device 100.

The ECC circuit 330 may perform ECC decoding on data output from the nonvolatile memory device 100. The ECC circuit 330 may correct an error by using a parity.

For example, the ECC circuit 330 may correct an error by using various coded modulations such as an LDPC code, a BCH code, a turbo code, a Reed-Solomon code, a convolution code, an RSC, a TCM, and a BCM.

The ECC circuit 330 may calculate an ECC value of data to be programmed to the nonvolatile memory device 100 in a program operation.

The ECC circuit 330 may perform an error correction operation on data read from the nonvolatile memory device 100 in a read operation based on the ECC value.

The ECC circuit 330 may perform an error correction operation of data recovered from the nonvolatile memory device 100 in a recovery operation of data which fails.

The memory controller 300 may communicate with an external device (e.g., the host 400, an application processor, or the like) through the host interface 340.

The ROM 350 may store, in the form of firmware, various information required in an operation of the memory controller 200.

The memory controller 300 may communicate with the nonvolatile memory device 100 through the flash interface 360. The memory controller 300 may transmit a command CMD, an address ADDR, a control signal CTRL, and the like to the nonvolatile memory device 100 through the flash interface 360, and receive data DATA.

The flash interface 360 may include, for example, a NAND interface.

Figure 15:
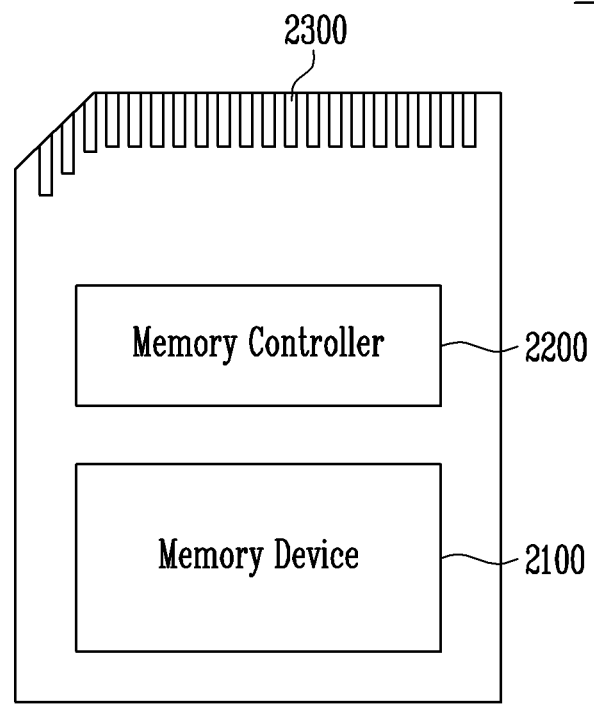
FIG. 15 is a block diagram illustrating a memory card system to which any of the storage devices is applied in accordance with the embodiments of the present disclosure.

FIG. 15 is a block diagram illustrating a memory card system to which any of the storage devices in accordance with the embodiments of the present disclosure is applied.

Referring to FIG. 15, the memory card system 2000 includes a memory device 2100, a memory controller 2200, and a connector 2300.

The memory device 2100 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2200 is connected to the memory device 2100. The memory controller 2200 may access the memory device 2100. For example, the memory controller 2200 may control read, write, erase, and background operations of the memory device 2100. The memory controller 2200 provides an interface between the memory device 2100 and a host Host. The memory controller 2200 drives firmware for controlling the memory device 2100. The memory controller 2200 may be implemented identically to the memory controller 200 described with reference to FIG. 1.

The memory controller 2200 may include components such as a Random Access Memory (RAM), a processing unit, a host interface, a memory interface, and an error corrector.

The memory controller 2200 may communicate with an external device through the connector 2300. The memory controller 2200 may communicate with the external device (e.g., the host 400) according to a specific communication protocol. The memory controller 2200 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. The connector 2300 may be defined by at least one of the above-described various communication protocols.

The memory device 2100 and the memory controller 2200 may be integrated into a single semiconductor device, to constitute a memory card. For example, the memory controller 2200 and the memory device 2100 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 16:
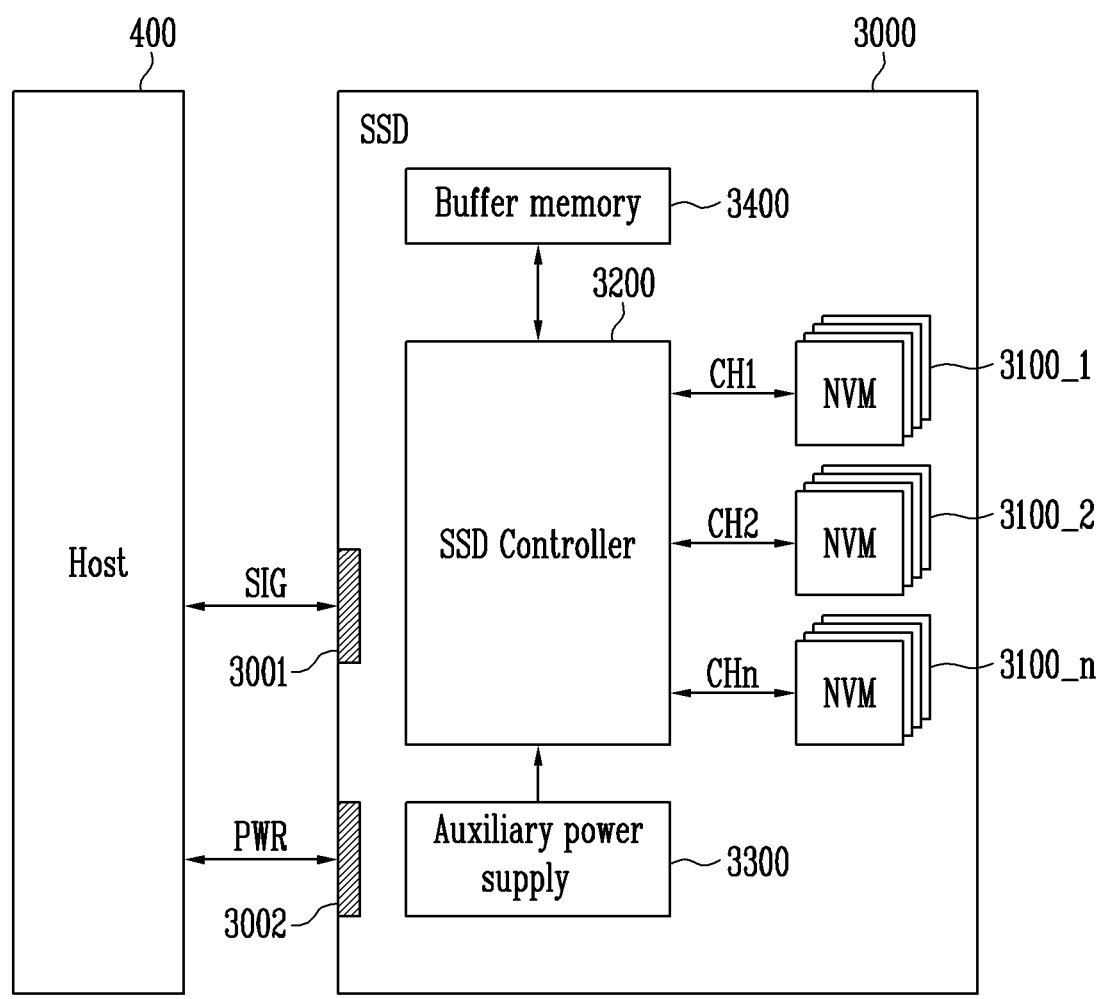
FIG. 16 is a block diagram exemplarily illustrating a Solid State Drive (SSD) system to which any of the storage devices is applied in accordance with the embodiments of the present disclosure.

FIG. 16 is a block diagram illustrating a Solid State Drive (SSD) system to which any of the storage devices is applied in accordance with the embodiments of the present disclosure.

Referring to FIG. 16, The SSD 3000 exchanges a signal SIG with the host 400 through a signal connector 3001, and receives power PWR through a power connector 3002. The SSD 3000 includes an SSD controller 3200, a plurality of flash memories 3100_1, 3100_2, and 3100_n, an auxiliary power supply 3300, and a buffer memory 3400.

In accordance with an embodiment of the present disclosure, the SSD controller 3200 may perform the same function as the memory controller 200 described with reference to FIG. 1.

The SSD controller 3200 may control the plurality of flash memories 3100_1, 3100_2, and 3100_n in response to a signal SIG received from the host 400. The signal SIG may be a signal defined by an interface between the host 400 and the SSD 3000. For example, the signal SIG may be defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3300 is connected to the host 400 through the power connector 3002. The auxiliary power supply 3300 may receive the power PWR input from the host 400, and charge the power PWR. When the supply of power from the host 400 is not smooth, the auxiliary power supply 3300 may provide power to the SSD 3000. The auxiliary power supply 3300 may be located in the SSD 3000, or be located at the outside of the SSD 3000. For example, the auxiliary power supply 3300 may be located on a main board, and provide auxiliary power to the SSD 3000.

The buffer memory 3400 may temporarily store data. For example, the buffer memory 3400 may temporarily store data received from the host 400 or data received from the plurality of flash memories 3100_1, 3100_2, and 3100_n, or temporarily store meta data (e.g., a mapping table) of the flash memories 3100_1, 3100_2, and 3100_n. The buffer memory 3400 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 17:
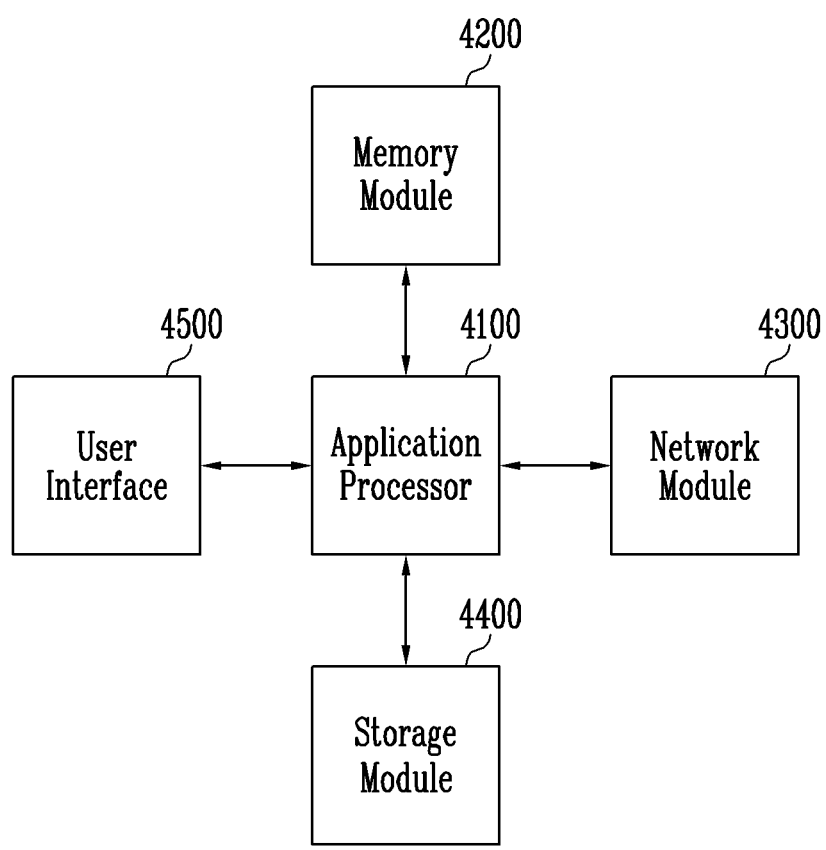
FIG. 17 is a block diagram illustrating a user system to which any of the storage devices is applied in accordance with the embodiments of the present disclosure.

FIG. 17 is a block diagram illustrating a user system to which any of the storage devices is applied in accordance with the embodiments of the present disclosure.

Referring to FIG. 17, the user system 4000 includes an application processor 4100, a memory module 4200, a network module 4300, a storage module 4400, and a user interface 4500.

The application processor 4100 may drive components included in the user system 4000, an operating system (OS), a user program, or the like. The application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 4100 and the memory module 4200 may be provided as one semiconductor package by being packaged based on a Package on Package (PoP).

The network module 4300 may communicate with external devices. The network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. The network module 4300 may be included in the application processor 4100.

The storage module 4400 may store data. For example, the storage module 4400 may store data received from the application processor 4100. Alternatively, the storage module 4400 may transmit data stored therein to the application processor 4100. The storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 4400 may be provided as a removable drive such as a memory card of the user system 4000 or an external drive.

The storage module 4400 may operate identically to the storage device 1000 described with reference to FIG. 1. The storage module 4400 may include a plurality of nonvolatile memory devices, and the plurality of nonvolatile memory devices may operate identically to the nonvolatile memory device 100 described with reference to FIG. 1.

The user interface 4500 may include interfaces for inputting data or commands to the application processor 4100 or outputting data to an external device. The user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a storage device capable of maintaining high security by sensing firmware corrupted by a malicious attack or a memory bit flip and resetting the corrupted firmware as valid firmware, and an operating method of the storage device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

The present disclosure described above is not limited by the aforementioned embodiments and the accompanying drawings, and those skilled in the art in light of the present disclosure will recognize that various substitutions, modifications, and changes can be made without departing from the technical spirit of the present disclosure as defined in the following claims.

What is claimed is:

1. A storage device comprising:
a nonvolatile memory device including a system block for storing firmware data including a program code of firmware, a signature in which the program code is encoded, and an authentication key;
a volatile memory device configured to store operational firmware data; and
a memory controller configured to, when power is applied to the storage device, store the firmware data as the operational firmware data in the volatile memory device, perform a firmware validity test for detecting whether the operational firmware data and the firmware data matches each other, in response to a test event, and perform a reset operation based on a result of the firmware validity test.

2. The storage device of claim 1,
wherein the volatile memory device stores the signature and the authentication key, which are loaded from the nonvolatile memory device, in response to the power being applied to the storage device, and
wherein the memory controller includes:
a firmware validity tester configured to detect whether an encoded message corresponding to an operational program code included in the operational firmware data and the signature decoded based on the authentication key matches each other; and
a firmware operating component configured to change operational firmware, which is being currently executed and corresponds to the operational firmware data, to firmware corresponding to the firmware data and execute the changed firmware in response to a discordance result provided from the firmware validity tester.

3. The storage device of claim 2, wherein the firmware validity tester includes:
an encoded message generator configured to generate the encoded message based on the operational program code included in the operational firmware data;
a signature decoding component configured to output the decoded signature by using the signature and the authentication key, which are provided from the volatile memory device; and
a message comparator configured to output the discordance result in response to that the encoded message and the decoded signature do not match each other.

4. The storage device of claim 1,
wherein the volatile memory device stores the firmware data loaded from the nonvolatile memory device in response to the test event being detected, and
the memory controller includes:
a firmware validity tester configured to verify reliability of the firmware data stored in the volatile memory device, and detects whether the program code included in the firmware data of which the reliability is verified and an operational program code included in the operational firmware data matches each other; and a firmware operating component configured to change operational firmware, which is being currently executed and corresponds to the operational firmware data, to firmware corresponding to the firmware data and execute the changed firmware in response to a discordance result provided from the firmware validity tester.

5. The storage device of claim 4, wherein the firmware validity tester includes:

a firmware data reliability verifying component configured to generate an encoded message based on the program code included in the firmware data stored in the volatile memory device, generate a decoded signature based on the signature and the authentication key included in the firmware data stored in the volatile memory device, verify the reliability of the firmware data stored in the volatile memory device according to whether the encoded message and the decoded signature accord with each other, and output the program code included in the firmware data stored in the volatile memory device in response to the reliability of the firmware data being verified; and a code comparator configured to output the discordance result in response to that the program code included in the firmware data stored in the volatile memory device and the operational program code included in the operational firmware data do not match each other.

6. The storage device of claim 1, wherein the memory controller:

measures a test operation time corresponding to an amount of time taken to perform the firmware validity test;

reserves the firmware validity test according to whether the test operation time has reached a predetermined maximum operation time; and stores a test command indicating that the firmware validity test is to be started according to a predetermined scheduling order in response to the firmware validity test being reserved.

7. The storage device of claim 6, wherein the memory controller detects the test event according to whether the stored test command has been output according to the scheduling order.

8. The storage device of claim 1, wherein the memory controller detects the test event according to whether an amount of time for which the memory controller is turned on corresponds to a predetermined test period.

9. The storage device of claim 1, wherein the memory controller detects the test event according to whether a state of the memory controller is an idle state, and wherein the idle state is a state in which the memory controller stands by from when a response to a request from a host is provided to the host to when a subsequent request is provided from the host to the memory controller.

10. The storage device of claim 1, wherein the memory controller detects the test event according to whether the memory controller receives an erase request or a storage device lock request from a host.

11. The storage device of claim 1, wherein the memory controller suspends an operation corresponding to a request provided from a host before the reset operation is performed.

12. A storage device comprising:

a nonvolatile memory device including a system block for storing firmware data including a program code of firmware, a signature in which the program code is encoded, and an authentication key;

a first volatile memory device configured to store operational firmware data;

a second volatile memory device configured to store the firmware data;

a first firmware controller configured to, when power is applied to the storage device, store the firmware data as the operational firmware data in the first volatile memory device, and execute operational firmware; and a second firmware controller configured to perform a firmware validity test for detecting whether the operation firmware data acquired from the first volatile memory device and the firmware data stored in the second volatile memory device matches each other in response to a test event being detected and perform a reset operation on the operational firmware data stored in the first volatile memory device based on a result obtained by performing the firmware validity test.

13. The storage device of claim 12, wherein the second volatile memory device stores the signature and the authentication key, which are loaded from the nonvolatile memory device, in response to the power being applied to the storage device, and wherein the second firmware controller generates a decoded signature based on the signature and the authentication key, which are provided from the second volatile memory device, generates an encoded message based on an operational program code included in the operation firmware data, and controls the first firmware controller to change operational firmware, which is being executed by the first firmware controller and corresponds to the operational firmware data, to firmware corresponding to the firmware data and to execute the changed firmware, according to whether the decoded signature and the encoded message matches each other.

14. The storage device of claim 12, wherein the second volatile memory device stores the firmware data loaded from the nonvolatile memory device in response to the test event being detected, and wherein the second firmware controller verifies reliability of the firmware data stored in the second volatile memory device, and controls the first firmware controller to change operational firmware, which is being executed by the first firmware controller and corresponds to the operational firmware data, to firmware corresponding to the firmware data and to execute the changed firmware, according to whether the program code included in the firmware data of which the reliability is verified and an operational program code included in the operational firmware data matches each other.

15. The storage device of claim 14, wherein the second firmware controller generates an encoded message based on the program code included in the firmware data stored in the second volatile memory device, generates a decoded signature based on the signature and the authentication key included in the firmware data stored in the second volatile memory device, verifies the reliability of the firmware data stored in the second volatile memory device according to whether the encoded message and the decoded signature accord with each other, and extracts the program code from the firmware data of which the reliability is verified in response to the reliability of the firmware data being verified.

16. The storage device of claim 12, wherein the second firmware controller controls the first firmware controller to suspend an operation corresponding to a request provided from a host, before the reset operation is performed.

17. A storage device comprising:
a nonvolatile memory device including a system block for storing firmware data including a program code of firmware, a signature in which the program code is encoded, and an authentication key;
a first volatile memory device configured to store operational firmware data;
a second volatile memory device configured to store the firmware data;
a first firmware controller configured to, when power is applied to the storage device, store the firmware data as the operational firmware data in the first volatile memory device, and execute operational firmware; and
a second firmware controller configured to provide the first firmware controller with a request signal for requesting the first firmware controller to transmit the operational firmware data in response to a test event being detected, perform a firmware validity test for detecting whether the operational firmware data provided from the first firmware controller and the firmware data stored in the second volatile memory device matches each other and perform a reset operation on the operational firmware data stored in the first volatile memory device based on a result obtained by performing the firmware validity test.

18. The storage device of claim 17,
wherein the first firmware controller generates an encoded message based on an operational program code included in the operational firmware data and transmits the encoded message to the second firmware controller in response to the request signal,
wherein the second volatile memory device stores the signature and the authentication key, which are loaded from the nonvolatile memory device, in response to the power being applied to the storage device, and
wherein the second firmware controller generates a decoded signature based on the signature and the authentication key, which are provided from the second volatile memory device, and controls the first firmware controller to change operational firmware, which is being executed by the first firmware controller and corresponds to the operational firmware data, to firmware corresponding to the firmware data and execute the changed firmware, according to whether the encoded message received from the first firmware controller and the decoded signature matches each other.

19. The storage device of claim 17,
wherein the first firmware controller transmits the second firmware controller with an operational program code included in the operational firmware data in response to the request signal,
wherein the second volatile memory device stores the firmware data loaded from the nonvolatile memory device in response to the test event being detected,
wherein the second firmware controller verifies reliability of the firmware data stored in the second volatile memory device, extracts the program code from the firmware data of which the reliability is verified in response to the reliability of the firmware data being verified, and controls the first firmware controller to change operational firmware, which is being executed by the first firmware controller and corresponds to the operational firmware data, to firmware corresponding to the firmware data and to execute the changed firmware, according to whether the extracted program code and the operational program code received from the first firmware controller matches each other, and
wherein the second firmware controller generates an encoded message based on the program code included in the firmware data stored in the second volatile memory device, generates a decoded signature based on the signature and the authentication key included in the firmware data stored in the second volatile memory device, and verifies the reliability of the firmware data stored in the second volatile memory device according to whether the encoded message and the decoded signature accord with each other.

20. The storage device of claim 17, wherein the second firmware controller controls the first firmware controller to suspend an operation corresponding to a request provided from a host, before the reset operation is performed.

* * * * *